US011860570B2

(12) United States Patent
Nagasawa et al.

(10) Patent No.: US 11,860,570 B2
(45) Date of Patent: Jan. 2, 2024

(54) TONER SET AND IMAGE FORMING METHOD

(71) Applicant: Konica Minolta, Inc., Tokyo (JP)

(72) Inventors: Hiroshi Nagasawa, Hino (JP); Yusuke Takigaura, Hino (JP); Takaki Kawamura, Hino (JP); Ami Motohashi, Hachioji (JP); Natsuki Ito, Hachioji (JP); Shiro Hirano, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 324 days.

(21) Appl. No.: 17/340,471

(22) Filed: Jun. 7, 2021

(65) Prior Publication Data

US 2022/0004113 A1 Jan. 6, 2022

(30) Foreign Application Priority Data

Jul. 1, 2020 (JP) ................................. 2020-114093

(51) Int. Cl.
*G03G 9/09* (2006.01)
*G03G 9/087* (2006.01)
*G03G 15/01* (2006.01)
*G03G 9/097* (2006.01)

(52) U.S. Cl.
CPC ....... *G03G 9/0924* (2013.01); *G03G 9/08711* (2013.01); *G03G 9/08755* (2013.01); *G03G 9/09733* (2013.01); *G03G 15/0126* (2013.01)

(58) Field of Classification Search
CPC .. G03G 9/0918; G03G 9/091; G03G 9/08755; G03G 9/08711
See application file for complete search history.

(56) References Cited

U.S. PATENT DOCUMENTS

2006/0292472 A1* 12/2006 Ono .................. G03G 9/09783 430/137.14
2018/0059565 A1* 3/2018 Kamae ................ G03G 9/0918
2019/0294064 A1* 9/2019 Sugama ............ G03G 9/08797

FOREIGN PATENT DOCUMENTS

JP 2008-176311 * 7/2008 .............. G03G 9/09
JP 2019-168618 A 10/2019
WO WO 2012/077503 * 6/2012 ............ G03G 9/087

OTHER PUBLICATIONS

Translation of JP 2008-176311.*

* cited by examiner

*Primary Examiner* — Peter L Vajda
(74) *Attorney, Agent, or Firm* — LUCAS & MERCANTI, LLP

(57) ABSTRACT

A toner set includes a plurality of toners, wherein the toner set includes a first toner containing a yellow colorant and a second toner containing a cyan colorant, the first toner and the second toner each contain a binder resin containing a vinyl-based resin and a crystalline resin, and a release agent containing a hydrocarbon wax, a content of the vinyl-based resin with respect to a total mass of the binder resin is 50% by mass or more, the first toner contains the crystalline resin having a moiety having a crystal structure and a crystal nucleating agent moiety having a crystal nucleating agent, and the second toner contains the cyan colorant that is a compound represented by general formula (1).

[Chemical formula 1]

(1)

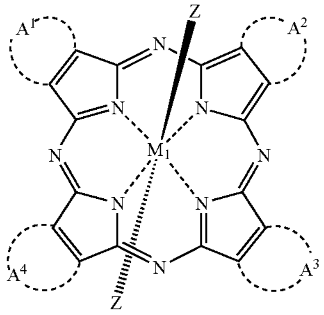

17 Claims, No Drawings

TONER SET AND IMAGE FORMING METHOD

The entire disclosure of Japanese patent Application No. 2020-114093, filed on Jul. 1, 2020, is incorporated herein by reference in its entirety.

BACKGROUND

Technological Field

The present invention relates to a toner set and an image forming method.

Description of the Related Art

In a thermally fixing method widely used as one of toner fixing methods, in recent years, it has been required to reduce thermal energy during toner image fixing for the purpose of increasing a printing speed, saving energy, and the like.

In order to reduce the thermal energy during toner image fixing, it is required to improve low-temperature fixability of a toner. As one of methods therefor, a method for adding a crystalline resin or a low melting point release agent to a toner to lower the melting temperature and the melting viscosity of a binder resin to improve the low-temperature fixability is known.

JP 2019-168618 A discloses an electrostatic charge image developing toner containing a binder resin containing a crystalline hybrid resin obtained by chemically bonding an amorphous resin unit other than a polyester resin and a crystalline polyester resin unit to each other and a vinyl-based resin, and a release agent containing a hydrocarbon-based wax. According to JP 2019-168618 A, by controlling an average distance between each of the center of domains of the crystalline hybrid resin formed in the toner particle and the center of domains of the release agent, and a surface of the toner particle, filming after high temperature storage can be suppressed while low-temperature fixability is improved.

As described in JP 2019-168618 A, a toner containing a crystalline resin is known.

A toner is usually used as a toner set obtained by combining toners of a plurality of colors, having different types or amounts of colorants. According to findings of the present inventors, in an image formed using a toner containing a crystalline resin, a tacking phenomenon occurs disadvantageously in which parts of the image adhere to each other. In addition, a toner is easily peeled off disadvantageously at a crease of the formed image.

SUMMARY

The present invention has been achieved in view of the above circumstances, and an object of the present invention is to provide a toner set and an image forming method that can suppress tacking and further improve fold fixability even if the toner set contains a crystalline resin.

To achieve the abovementioned object, according to an aspect of the present invention, a toner set reflecting one aspect of the present invention comprises a plurality of toners, wherein the toner set includes a first toner containing a yellow colorant and a second toner containing a cyan colorant, the first toner and the second toner each contain a binder resin containing a vinyl-based resin and a crystalline resin, and a release agent containing a hydrocarbon wax, a content of the vinyl-based resin with respect to a total mass of the binder resin is 50% by mass or more, the first toner contains the crystalline resin having a moiety having a crystal structure and a crystal nucleating agent moiety having a crystal nucleating agent, and the second toner contains the cyan colorant that is a compound represented by general formula (1):

[Chemical formula 1]

(1)

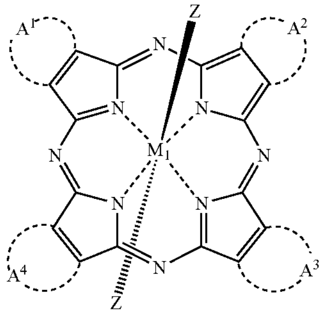

where, M represents any one of a silicon atom, a germanium atom, a cobalt atom, and a zinc atom, $A^1$, $A^2$, $A^3$, and $A^4$ each independently represent an atomic group forming an aromatic ring which may have an electron-withdrawing substituent, and Zs each independently represent an aryloxy group having 6 or more and 18 or less carbon atoms, an alkoxy group having 1 or more and 22 or less carbon atoms, or a group represented by the following general formula (1-1), and

[Chemical formula 2]

(1-1)

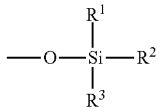

where, $R^1$, $R^2$, and $R^3$ each independently represent an alkyl group, an aryl group, or an alkoxy group having 1 or more and 6 or less carbon atoms.

DETAILED DESCRIPTION OF EMBODIMENTS

Hereinafter, one or more embodiments of the present invention will be described. However, the scope of the invention is not limited to the disclosed embodiments.

1. Toner Set

A toner set according to an embodiment of the present invention (hereinafter, also simply referred to as "toner set") contains a plurality of toners, and the toner set contains a first toner containing a yellow colorant and a second toner containing a cyan colorant. The first toner and the second toner each contain a binder resin containing a vinyl-based resin and a crystalline resin, and a release agent containing a hydrocarbon wax, in which the content of the vinyl-based resin with respect to the total mass of the binder resin is 50% or more. The first toner contains the crystalline resin having a moiety having a crystal structure and a crystal nucleating agent moiety having a crystal nucleating agent, and the second toner contains the cyan colorant that is a compound represented by the above general formula (1).

The first toner may be any toner as long as the first toner contains a yellow colorant among the plurality of types of toners contained in the toner set, but is preferably a toner in which the content of the yellow colorant with respect to the total mass of the toner is the largest. The second toner may be any toner as long as the second toner contains a cyan colorant among the plurality of types of toners contained in the toner set, but is preferably a toner in which the content of the cyan colorant with respect to the total mass of the toner is the largest.

For example, the toner set contains toners of four colors, yellow (Ye), magenta (Ma), cyan (Cy), and black (Bk). At this time, the first toner can be the yellow toner (Ye), and the second toner can be the cyan (Cy) toner.

Note that the toner set may contain a toner of a color other than the above colors, such as blue, pink, green, or orange, or a clear toner. The toner set may contain a plurality of types of toners of the same color, and may contain, for example, a plurality of types of yellow toners having different contents of the yellow colorant. At this time, a yellow toner having a larger content of the yellow colorant with respect to the total mass of the toner only needs to be used as the first toner. Similarly, the toner set may contain a plurality of types of cyan toners having different contents of the cyan colorant. At this time, a cyan toner having a larger content of the cyan colorant with respect to the total mass of the toner only needs to be used as the second toner.

The crystalline resin contained in the toner rapidly melts and largely reduces the viscosity thereof when the temperature thereof rises to a temperature higher than the melting point thereof during heating (sharp melt property). Therefore, it is said that the crystalline resin promotes softening of the toner during heating and makes fixing of the toner at a low temperature possible.

However, according to findings of the present inventors, recrystallization of the crystalline resin after softening is less likely to proceed sufficiently in an image after the toner is fixed. Therefore, the toner containing the crystalline resin may maintain a state where elasticity is low after fixing until a recording medium to which the toner is fixed is loaded on a paper discharge unit. Then, when the recording medium is loaded on the paper discharge unit in a state where the elasticity of the toner is low, a tacking phenomenon occurs in which the image (toner) adheres to the adjacent recording medium.

In addition, according to findings of the present inventors, in order to improve low-temperature fixability of the toner, an ester wax having a low melting point is often used as the release agent (wax) contained in the toner. In a case where an image is formed using a toner containing the ester wax, after the toner is fixed, a recording medium is easily conveyed to a paper discharge unit while the wax present on an image surface layer is melted during image conveyance. As a result, a tacking phenomenon derived from the ester wax may occur in the paper discharge unit, or the melted wax may come into contact with a member such as a conveyance roller and adhere to the member. At this time, if the adhering wax is cooled and fixed to cause conveyance failure or in-machine contamination, the wax adhering to the member or the like is transferred onto an image on a recording medium to be conveyed next, and gloss unevenness of the image also occurs disadvantageously.

On the other hand, in the present invention, the first toner containing a yellow colorant, disposed on the outermost layer of a formed image, contains a crystalline resin having a moiety having a crystal structure and a crystal nucleating agent moiety having a crystal nucleating agent, and therefore recrystallization after the toner is fixed is accelerated. It is considered that this makes tacking less likely to occur. In addition, it is considered that the crystalline resin having a crystal nucleating agent moiety seeps to an image surface together with the wax, and therefore wax adhesion is also suppressed in the image formed such that the first toner is on the outermost layer.

In addition, in the present invention, by using a hydrocarbon wax having a melting point higher than that of the ester wax as the release agent contained in each of the first toner and the second toner, a crystallization start temperature of the wax is high. Therefore, it is considered that wax adhesion to each unit in an image forming device can be suppressed, and tacking can also be suppressed by crystallization of the wax present on the outermost surface of an image.

Furthermore, the first toner and the second toner each contain a binder resin containing a vinyl-based resin and a crystalline resin, in which the content of the vinyl-based resin with respect to the total mass of the binder resin is 50% by mass or more. As a result, the vinyl-based resin is located on a sea side of a sea-island structure, and domains of the crystalline resin can be finely dispersed. Therefore, when the toner is fixed to a base material, the entire toner can be melted rapidly, and rapid crystallization of domains of the crystalline resin is promoted. Therefore, it is considered that low-temperature fixability can be improved and tacking can be suppressed. In addition, in an image in which the second toner is located on a lower layer than the first toner, when the content of the vinyl-based resin with respect to the total mass of the binder resin contained in the second toner is 50% by mass, it is considered that excessive growth of domains of the crystalline resin can be suppressed and fold fixability is improved.

For these reasons, it is considered that the toner set can suppress tacking even if the toner set contains the crystalline resin.

1-1. First Toner

The first toner only needs to be a known toner containing a yellow colorant. For example, the first toner contains a binder resin, a release agent, and a colorant.

1-1-1. Binder Resin

The binder resin only needs to contain a vinyl-based resin and a crystalline resin, and may contain another resin as long as the effects of the present invention are exhibited.

[Amorphous Resin]

<Vinyl-Based Resin>

In the present invention, the vinyl-based resin refers to a polymer exhibiting amorphousness among polymers each formed by a monomer having a vinyl group (hereinafter, referred to as a vinyl monomer).

In the present invention, an "amorphous" resin is defined as a resin that does not exhibit a clear endothermic peak when differential scanning calorimetry (DSC) is performed. The amorphous resin has a relatively high glass transition temperature.

The glass transition point (Tg) of the vinyl-based resin is preferably 25° C. or higher and 55° C. or lower, and more preferably 30° C. or higher and 50° C. or lower from a viewpoint of achieving both sufficient low-temperature fixability and heat-resistant storage.

The glass transition point (Tg) can be measured using a differential scanning calorimeter, for example, a diamond DSC (manufactured by Perkin Elmer Inc.). Specifically, 3.0 mg of a sample is sealed in an aluminum pan, and the temperature is changed in order of heating, cooling, and heating. The temperature is raised from room temperature (25° C.) at the time of first heating and from 0° C. at the time of second heating to 200° C. at a temperature rising rate of 10° C./min and maintained at 150° C. for five minutes. At the time of cooling, the temperature is lowered from 200° C. to 0° C. at a temperature falling rate of 10° C./min, and the temperature of 0° C. is maintained for five minutes. A baseline shift in a measurement curve obtained at the time of second heating is observed, and an intersection of an extension of the baseline before the shift and a tangent indicating a maximum slope of the shifted portion of the baseline is taken as a glass transition point (Tg). An empty aluminum pan is used as a reference.

The vinyl-based resin is not particularly limited as long as the vinyl-based resin has the above characteristics, and a vinyl-based resin known in the present technological field can be used. Examples of the vinyl-based resin include a styrene-acrylic resin, a styrene resin, and an acrylic resin. A styrene-acrylic resin is preferable from a viewpoint of excellent heat resistance.

Examples of the vinyl monomer include the following (1) to (7), and these monomers can be used singly or in combination of two or more types thereof.

(1) Styrene-Based Monomer

Examples of a styrene-based monomer include monomers each having a styrene structure, such as styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, p-n-dodecylstyrene, and derivatives thereof.

(2) (Meta)Acrylate-Based Monomer

Examples of a (meth)acrylate-based monomer include monomers each having a (meth)acrylic group, such as methyl (meth)acrylate, ethyl (meth)acrylate, n-butyl (meth) acrylate, isopropyl (meth)acrylate, isobutyl (meth)acrylate, t-butyl (meth)acrylate, n-octyl (meth)acrylate, 2-ethylhexyl (meth)acrylate, stearyl (meth)acrylate, lauryl (meth)acrylate, phenyl (meth)acrylate, diethylaminoethyl (meth)acrylate, dimethylaminoethyl (meth)acrylate, and derivatives thereof.

(3) Vinyl Ester

Examples of a vinyl ester include vinyl propionate, vinyl acetate, and vinyl benzoate.

(4) Vinyl Ether

Examples of a vinyl ether include vinyl methyl ether and vinyl ethyl ether.

(5) Vinyl Ketone

Examples of a vinyl ketone include vinyl methyl ketone, vinyl ethyl ketone, and vinyl hexyl ketone.

(6) N-Vinyl Compound

Examples of an N-vinyl compound include N-vinylcarbazole, N-vinylindole, and N-vinylpyrrolidone.

(7) Others

Examples of other vinyl monomers include a vinyl compound such as vinylnaphthalene or vinylpyridine, an acrylic acid such as acrylonitrile, methacrylnitrile, or acrylamide, and a methacrylic acid derivative.

As the vinyl monomer, it is preferable to use a monomer having an ionic dissociation group such as a carboxy group, a sulfonic acid group, or a phosphoric acid group because affinity with the crystalline resin can be easily controlled.

Examples of the monomer having a carboxy group include acrylic acid, methacrylic acid, maleic acid, itaconic acid, cinnamic acid, fumaric acid, a maleic acid monoalkyl ester, and an itaconic acid monoalkyl ester.

Examples of the monomer having a sulfonic acid group include styrene sulfonic acid, allyl sulfosuccinic acid, and 2-acrylamide-2-methylpropanesulfonic acid.

Examples of the monomer having a phosphoric acid group include acidophosphoxyethyl methacrylate.

Furthermore, by using a polyfunctional vinyl as the vinyl monomer, a polymer having a crosslinked structure can also be obtained. Examples of the polyfunctional vinyl include divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, and neopentyl glycol diacrylate.

The content of the vinyl-based resin with respect to the total mass of the binder resin is 50% by mass or more, preferably 50% by mass or more and 96% by mass or less, and more preferably 60% by mass or more and 90% by mass or less. When the content is 50% by mass or more, the vinyl-based resin is located on a sea side of a sea-island structure, and domains of the crystalline resin can be finely dispersed. When the content is 96% by mass or less, low-temperature fixability due to the crystalline resin can be ensured.

<Amorphous Polyester Resin>

In the present invention, the amorphous resin in the binder resin may contain an amorphous polyester resin.

The amorphous polyester resin is a resin exhibiting amorphousness among polyester resins obtained by a polymerization reaction between a divalent or higher valent carboxylic acid (polycarboxylic acid) monomer and a divalent or higher valent alcohol (polyhydric alcohol) monomer. The amorphous polyester resin can be formed by polymerizing (esterifying) the polycarboxylic acid monomer and the polyhydric alcohol monomer using a known esterification catalyst.

The polycarboxylic acid monomer is a compound having two or more carboxy groups in one molecule.

Examples of the polycarboxylic acid monomer that can be used for synthesis of the amorphous polyester resin include phthalic acid, isophthalic acid, terephthalic acid, trimellitic acid, naphthalene-2,6-dicarboxylic acid, malonic acid, mesaconic acid, dimethyl isophthalate, fumaric acid, dodecenyl succinic acid, and 1,10-dodecanedicarboxylic acid. Among these monomers, dimethyl isophthalate, terephthalic acid, dodecenyl succinic acid, or trimellitic acid is preferable.

The polyhydric alcohol monomer is a compound having two or more hydroxy groups in one molecule.

Examples of the polyhydric alcohol monomer that can be used for synthesis of the amorphous polyester resin include, as a dihydric or trihydric alcohol, ethylene glycol, propylene glycol, 1,4-butanediol, 2,3-butanediol, diethylene glycol, triethylene glycol, 1,5-pentanediol, 1,6-hexanediol, neopentyl glycol, 1,4-cyclohexanedimethanol, dipropylene glycol, polyethylene glycol, polypropylene glycol, an ethylene oxide adduct of bisphenol A (BPA-EO), a propylene oxide adduct of bisphenol A (BPA-PO), glycerin, sorbitol, 1,4-sorbitan, and trimethylolpropane. Among these alcohols, an ethylene oxide adduct of bisphenol A and a propylene oxide adduct of bisphenol A are preferable.

Examples of the esterification catalyst that can be used include an alkali metal compound of sodium or lithium; an alkaline earth metal compound of magnesium or calcium; a metal compound of aluminum, zinc, manganese, antimony, titanium, tin, zirconium, or germanium; a phosphorous acid compound; a phosphoric acid compound, and an amine compound.

The polymerization temperature is not particularly limited, but is preferably 150° C. or higher and 250° C. or lower. The polymerization time is not particularly limited, but is preferably 0.5 hours or more and 10 hours or less. During polymerization, the pressure inside the reaction system may be reduced as necessary.

The content of the amorphous polyester resin with respect to the total mass of the binder resin is preferably 5% by mass or more and 30% by mass or less, and more preferably 10% by mass or more and 20% by mass or less from a viewpoint of improving fold fixability.

The glass transition point (Tg) of the amorphous polyester resin is preferably 25° C. or higher and 60° C. or lower, and more preferably 35° C. or higher and 55° C. or lower from a viewpoint of achieving both sufficient low-temperature fixability and heat-resistant storage. The glass transition point (Tg) can be measured using a differential scanning calorimeter, for example, a diamond DSC (manufactured by Perkin Elmer Inc.) in a similar manner to the vinyl-based resin.

The weight average molecular weight (Mw) of the amorphous polyester resin can usually be 5000 or more and 100000 or less, but is preferably 10000 or more and 60000 or less, and more preferably 12000 or more and 40,000 or less. When the weight average molecular weight of the amorphous polyester resin is within the above range, both sufficient low-temperature fixability and heat-resistant storage can be achieved. The weight average molecular weight (Mw) of the amorphous polyester resin can be measured using gel permeation chromatography (GPC).

[Crystalline Resin]

In the present invention, the crystalline resin is not limited as long as the crystalline resin is a resin exhibiting crystallinity, and a known crystalline resin can be used. Exhibiting crystallinity means having not a stepwise endothermic change but a clear endothermic peak at a melting point, that is, when the temperature rises in an endothermic curve obtained by DSC. The clear endothermic peak refers to a peak having an endothermic peak half-width of 15° C. or less when measurement is performed at a temperature rising rate of 10° C./min in differential scanning calorimetry (DSC).

The melting point of the crystalline resin is preferably 50° C. or higher and 90° C. or lower, more preferably 60° C. or higher and 85° C. or lower, and still more preferably 65° C. or higher and 80° C. or higher from a viewpoint of achieving low-temperature fixability. When the melting point is 50° C. or higher, in a storage state, melting of a part of the crystalline resin in the toner can be suppressed. When the melting point is 90° C. or lower, the amount of thermal energy required for fixing is small.

The melting point of the crystalline resin can be measured by performing differential scanning calorimetry (DSC) of the toner. For example, the melting point can be determined using a differential scanning calorimeter "Diamond DSC" (manufactured by Perkin Elmer Inc.). The measurement is performed according to measurement conditions (temperature rising/falling conditions) that go through a first temperature rising process in which the temperature is raised from room temperature (25° C.) to 150° C. at a temperature rising rate of 10° C./min and isothermally maintained at 150° C. for five minutes, a temperature falling process in which the temperature is lowered from 150° C. to 0° C. at a temperature falling rate of 10° C./min and isothermally maintained at 0° C. for five minutes, and a second temperature rising process in which the temperature is raised from 0° C. to 150° C. at a temperature rising rate of 10° C./min in this order. The above measurement is performed by enclosing 3.0 mg of the toner in an aluminum pan and setting the aluminum pan in a sample holder of a differential scanning calorimeter "Diamond DSC". An empty aluminum pan is used as a reference. In the above measurement, analysis is performed using an endothermic curve obtained from the first temperature rising process, and the top temperature of the endothermic peak derived from the crystalline resin is defined as the melting point of the crystalline resin.

In the present invention, the content of the crystalline resin with respect to the total mass of the binder resin is preferably 4% by mass or more and 15% by mass or less, and more preferably 7% by mass or more and 12% by mass or less from a viewpoint of achieving both low-temperature fixability and tacking suppression.

The weight average molecular weight (Mw) of the crystalline resin in the present invention can usually be 600 or more and 100000 or less, but is preferably 1000 or more and 29000 or less, more preferably 1000 or more and 20000 or less, and still more preferably 1000 or more and 15000 or less. When the weight average molecular weight is 1000 or more, crystallization proceeds without the crystalline resin being excessively compatible with the vinyl-based resin, which is excellent in terms of tacking suppression. In addition, it is possible to suppress occurrence of wax adhesion due to dissolution of the crystalline resin in the wax and difficulty in functioning as a nucleating agent. When the weight average molecular weight is 29000 or less, the crystalline resin is likely to be compatible with the vinyl-based resin when being melted, and is excellent in terms of low-temperature fixability. In addition, it is possible to suppress occurrence of wax adhesion due to a decrease in compatibility with the wax and suppression of seepage to an image surface together with the wax. The weight average molecular weight of the crystalline resin can be measured using gel permeation chromatography (GPC) in a similar manner to the vinyl-based resin.

Note that the weight average molecular weight of the crystalline resin can be measured and calculated after the crystalline resin and the release agent in the toner are separated from the toner. Hereinafter, a specific separation method will be described. The toner is dispersed in ethanol, which is a poor solvent for the toner, and the temperature is raised to a temperature exceeding the melting points of the crystalline resin and the wax to melt the crystalline resin and the wax. At this time, the pressure may be increased as necessary. Thereafter, a mixture of a crystalline polyester and the wax is collected from the toner by solid-liquid separation. By fractionating this mixture for each molecular weight, the crystalline polyester and the wax are separated from the toner.

The crystalline resin contained in the first toner in the present invention has a moiety having a crystal structure and a crystal nucleating agent moiety having a crystal nucleating agent.

<Moiety Having a Crystal Structure>

The "moiety having a crystal structure" in the present invention refers to a moiety having the above-described structure exhibiting crystallinity in the crystalline resin. The moiety having a crystal structure is present around the crystal nucleating agent moiety described later. Therefore, when the crystal nucleating agent moiety is first crystallized, crystallization is promoted starting from this crystal nucleating agent moiety. In addition, the crystalline resin seeps to a surface of the toner at the time of fixing the toner, and the crystal nucleating agent moiety promotes crystallization of the hydrocarbon wax. Therefore, it is considered that wax adhesion (contamination) is less likely to occur.

As the moiety having a crystal structure, a known crystalline resin (for example, a crystalline polyester resin or a crystalline polyurethane resin) is preferably used, and a crystalline polyester resin is particularly preferably used from a viewpoint of sharp melt at the time of melting and compatibility with the binder resin. That is, the moiety having a crystal structure preferably contains a crystalline polyester resin.

(Crystalline Polyester Resin)

In the present invention, the crystalline polyester resin refers to a resin exhibiting crystallinity among polyester resins obtained by a polycondensation reaction between a divalent or higher valent alcohol (polyhydric alcohol component) and a divalent or higher valent carboxylic acid (polycarboxylic acid component).

The polycarboxylic acid is a compound having two or more carboxy groups in one molecule. Specific examples thereof include: a saturated aliphatic dicarboxylic acid such as oxalic acid, malonic acid, succinic acid, adipic acid, sebacic acid, azelaic acid, n-dodecylsuccinic acid, nonanedicarboxylic acid, decanedicarboxylic acid, undecanedicarboxylic acid, dodecanedicarboxylic acid (dodecanedioic acid), or tetradecanedicarboxylic acid (tetradecanedioic acid); an alicyclic dicarboxylic acid such as cyclohexanedicarboxylic acid; an aromatic dicarboxylic acid such as phthalic acid, isophthalic acid, or terephthalic acid; a trivalent or higher valent polycarboxylic acid such as trimellitic acid or pyromellitic acid; and anhydrides of these carboxylic acid compounds or alkyl esters of these carboxylic acid compounds, each having 1 to 3 carbon atoms. These compounds may be used singly or in combination of two or more types thereof.

The polyhydric alcohol is a compound having two or more hydroxy groups in one molecule. Specific examples thereof include: an aliphatic diol such as 1,2-propanediol, 1,3-propanediol, 1,4-butanediol, 1,5-pentanediol, 1,6-hexanediol, 1,7-heptanediol, 1,8-octanediol, 1,9-nonanediol, dodecanediol, neopentyl glycol, or 1,4-butenediol; and a trihydric or higher hydric polyhydric alcohol such as glycerin, pentaerythritol, trimethylolpropane, or sorbitol. These compounds may be used singly or in combination of two or more types thereof.

A method for forming the crystalline polyester resin is not particularly limited, and the crystalline polyester resin can be formed by polycondensing (esterifying) the polyhydric alcohol component and the polycarboxylic acid component using a known esterification catalyst. As for a use ratio between the polyhydric alcohol component and the polycarboxylic acid component, the amount of hydroxy groups in the polyhydric alcohol component with respect to the amount of carboxy groups in the polycarboxylic acid component is preferably 1/1.5 or more and 1.5/1 or less, and more preferably 1/1.2 or more and 1.2/1 or less.

Examples of a catalyst that can be used for manufacturing the crystalline polyester resin include an alkali metal compound of sodium or lithium; an alkaline earth metal compound of magnesium or calcium; a metal compound of aluminum, zinc, manganese, antimony, titanium, tin, zirconium, or germanium; a phosphorous acid compound; a phosphoric acid compound, and an amine compound. Specific examples of the tin compound include dibutyltin oxide, tin ocrylate, tin dioctylate, and salts thereof. Examples of the titanium compound include: a titanium alkoxide such as tetranormal butyl titanate, tetraisopropyl titanate, tetramethyl titanate, or tetrastearyl titanate; a titanium acylate such as polyhydroxytitanium stearate; and a titanium chelate such as titanium tetraacetylacetate, titanium tetrabutoxide, titanium lactate, or titanium triethanol aminate Examples of the germanium compound include germanium dioxide. Examples of the aluminum compound include a hydroxide such as polyaluminum hydroxide, aluminum alkoxide, and tributylaluminate. These compounds may be used singly or in combination of two or more types thereof.

The polymerization temperature and the polymerization time are not particularly limited, and the pressure inside the reaction system may be reduced as necessary during polymerization.

(Hybrid Crystalline Polyester Resin)

In the present invention, inclusion of a hybrid crystalline polyester resin obtained by chemically bonding a crystalline polyester polymerization segment and a vinyl-based resin polymerization segment to each other as the crystalline resin is preferable because the hybrid crystalline polyester resin is more likely to be finely dispersed in the toner and excellent low-temperature fixability is achieved. That is, the moiety having a crystal structure preferably contains the hybrid crystalline polyester resin.

A ratio of an aliphatic carboxylic acid monomer and an aliphatic alcohol monomer derived from the crystal nucleating agent moiety with respect to all the units derived from monomers constituting the crystalline polyester polymerization segment is preferably 0.1 mol % or more and 3 mol % or less, and more preferably 0.5 mol % or more and 1 mol % or less. When the ratio is 0.1 mol % or more, an effect of suppressing fluctuations in fixability of the crystal nucleating agent moiety as the crystal nucleating agent can be sufficiently exhibited. When the ratio is 3 mol % or less, the melting point of the crystal nucleating agent moiety is not too high, and low-temperature fixability can be more preferable.

The crystalline polyester polymerization segment refers to a portion derived from the crystalline polyester resin, and a resin segment having not a stepwise endothermic change but a clear endothermic peak in differential scanning calorimetry (DSC) of the toner.

The crystalline polyester polymerization segment is not particularly limited as long as the crystalline polyester polymerization segment is as defined above. Examples thereof include a resin having a structure in which a main chain formed by the crystalline polyester polymerization segment is copolymerized with another component, and a resin having a structure in which the crystalline polyester polymerization segment is copolymerized with a main chain containing another component.

The crystalline polyester polymerization segment is generated by polycondensing a polycarboxylic acid monomer and a polyhydric alcohol monomer. As the polycarboxylic acid monomer and the polyhydric alcohol monomer, monomers similar to the polycarboxylic acid monomer and the polyhydric alcohol monomer, which are raw materials of the above crystalline polyester resin, can be used, respectively.

A method for forming the crystalline polyester polymerization segment is not particularly limited, and the segment can be formed by polycondensing (esterifying) the polycarboxylic acid and the polyhydric alcohol using a known esterification catalyst.

The crystalline polyester polymerization segment used in the present invention is preferably obtained by polymerizing a polyhydric alcohol monomer having 4 to 14 carbon atoms and a polycarboxylic acid monomer having 4 to 14 carbon atoms. When the number of carbon atoms is 4 or more, the number of hydrogen bonds derived from an ester bond is not too large, an excessive increase in the melting point of the crystalline polyester resin is suppressed, and low-temperature fixability can be more preferable. When the number of carbon atoms is 14 or less, an interaction between aliphatic groups is not too strong, an excessive increase in the melting point of the crystalline polyester resin is suppressed, and low-temperature fixability can be more preferable.

The polymerization segment of the vinyl-based resin (also referred to as vinyl-based polymerization segment) is synthesized from a vinyl monomer which is a raw material of the vinyl-based resin.

In the present invention, the content of the vinyl-based polymerization segment is preferably 3% by mass or more and 40% by mass or less, and more preferably 5% by mass or more and 20% by mass or less with respect to the total mass of the crystalline resin. This can increase low-temperature fixability. In particular, when the content is 3% by mass or more, stability of an interface between the crystalline resin and the vinyl-based resin which is a main binder is not excessively lowered, and fine dispersion can be achieved sufficiently. As a result, low-temperature fixability can be more preferable. When the content is 40% by mass or less, compatibility of the crystalline resin with the vinyl-based resin which is a main binder is not too high. As a result, heat-resistant storage can be preferable.

Examples of a method for synthesizing the hybrid crystalline polyester resin include the following (1) to (3).

(1) A method for synthesizing a hybrid crystalline polyester resin, the method including polymerizing a vinyl-based polymerization segment, and then performing a polymerization reaction to form a crystalline polyester polymerization segment in the presence of the vinyl-based polymerization segment.

(2) A method for synthesizing a hybrid crystalline polyester resin, the method including forming a crystalline polyester polymerization segment and a vinyl-based polymerization segment, and then bonding the crystalline polyester polymerization segment and the vinyl-based polymerization segment to each other.

(3) A method for synthesizing a hybrid crystalline polyester resin, the method including polymerizing a crystalline polyester polymerization segment, and then performing a polymerization reaction to form a vinyl-based polymerization segment in the presence of the crystalline polyester polymerization segment.

Among the above methods (1) to (3), the method (1) is preferable from a viewpoint of easily forming a hybrid crystalline polyester resin having a structure in which a crystalline polyester resin chain is grafted on a vinyl-based resin chain, and simplifying a manufacturing process.

The acid value of the crystalline resin in the present invention is preferably 9 mgKOH/g or more and 30 mgKOH/g, and more preferably 15 mgKOH/g or more and 23 mgKOH/g from a viewpoint of low-temperature fixability and fold fixability.

Note that the acid value of the crystalline polyester resin is the number of mg (mgKOH/g) of potassium hydroxide required for neutralizing carboxy groups present in 1 g of the resin. Specifically, the acid value is determined by a method in accordance with JIS K0070-1992.

<Crystal Nucleating Agent Moiety>

In the present invention, the "crystal nucleating agent moiety" is a moiety having a higher crystallization rate than the moiety having a crystal structure. First, the crystal nucleating agent moiety rapidly generates a crystal nucleus, and crystallization of the moiety having a crystal structure is promoted starting from the crystal nucleus. The crystal nucleating agent moiety is not particularly limited as long as the crystal nucleating agent moiety is a compound having a higher crystallization rate than the moiety having a crystal structure. In addition, the crystal nucleating agent moiety is preferably a compound having a main chain containing a hydrocarbon-based moiety and having one or more functional groups that can react with an end of a polyester moiety from a viewpoint of high crystallization rate. Furthermore, the crystal nucleating agent moiety is preferably a compound having a linear hydrocarbon-based moiety and having one or more functional groups that react with a polyester moiety.

According to findings of the present inventors, when a crystal nucleating agent is introduced separately from a resin, if the molecular weight of the crystal nucleating agent is low, the toner may bleed out during storage thereof to decrease a storage property or change chargeability. In order to suppress this disadvantage, the crystal nucleating agent is preferably contained in the resin.

In addition, according to findings of the present inventors, when the crystal nucleating agent is contained in an amorphous resin, particularly an amorphous resin having a high affinity with a vinyl-based resin, the wax is less likely to seep to an image surface at the time of fixing, and separability may deteriorate or fold fixability may be reduced due to the wax remaining in the image. Therefore, the crystal nucleating agent is preferably contained in the crystalline resin.

The crystal nucleating agent moiety is not particularly limited as long as the crystal nucleating agent moiety does not hinder the low-temperature fixability of the toner according to an embodiment of the present invention and causes crystallization more rapidly than a crystalline resin having no crystal nucleating agent moiety. However, the crystal nucleating agent moiety is preferably derived from at least one compound selected from the group consisting of an aliphatic monocarboxylic acid having 10 or more and 30 or less carbon atoms and an aliphatic monoalcohol having 10 or more and 30 or less carbon atoms from a viewpoint that a nucleation effect can be more stably exhibited and the effect of the present invention can be more preferably exhibited.

The aliphatic compound may be an unsaturated compound, a saturated compound, a branched compound, or a linear compound without being limited, but is preferably a saturated linear compound having 10 or more and 20 or less carbon atoms from a viewpoint of achieving both folding fixability and tacking suppression. The above crystal nucleating agent moiety may be bonded to any site of the above moiety having a crystal structure, but is preferably bonded to an end of a molecular chain that easily promotes crystallization of the moiety having a crystal structure.

Examples of the aliphatic monocarboxylic acid include stearic acid, lauric acid, arachidic acid, n-behenic acid, n-tetradocosanoic acid, n-hexadocosanoic acid, n-octadocosanoic acid, and n-triacontanoic acid.

Examples of the above aliphatic monoalcohol include stearyl alcohol, lauryl alcohol, behenyl alcohol, arachidyl alcohol, 1-octadecanol, 1-icosanol, 1-docosanol, 1-tetracosanol, 1-hexacosanol, 1-octacosanol, and 1-triacontanol.

The content of the crystal nucleating agent moiety with respect to the total mass of the crystalline resin excluding the crystal nucleating agent is preferably 1% by mass or more and 15% by mass or less, and more preferably 3% by mass or more and 9% by mass or less from a viewpoint of a tacking suppression effect and fold fixability. When the content is 1% by mass or more, tacking can be suppressed and fold fixability can be improved. When the content is 15% by mass or less, it can be suppressed that the crystalline resin and the wax are compatible with each other due to a too strong interaction between the crystalline resin and the wax. As a result, crystallization of the crystalline resin can be accelerated.

The crystal nucleating agent moiety is formed by polycondensing a monomer which is a raw material of the crystalline resin, and then putting the crystal nucleating agent into a reaction container to cause a reaction. At this time, the reaction only needs to be a reaction in which the crystalline polyester polymerization segment and the crystal nucleating agent can be chemically bonded to each other, and examples thereof include, but are not limited to, causing the reaction by heating at 200° C. under normal pressure.

1-1-2. Release Agent

The first toner in the present invention contains a release agent containing a hydrocarbon wax.

The hydrocarbon wax generally has a high melting point and a high crystallization start temperature, and therefore acts in a direction of suppressing tacking. In addition, lowering affinity with a fixing member leads to suppression of adhesion to the member, contamination in a machine, and image unevenness.

The melting point of the hydrocarbon wax used as the release agent according to an embodiment of the present invention is preferably 80° C. or higher and 92° C. or lower, and more preferably 80° C. or higher and 88° C. or lower from a viewpoint of tacking suppression and low-temperature fixability.

The hydrocarbon wax is not particularly limited, and a known hydrocarbon wax can be used. Examples of the hydrocarbon wax include: an aliphatic hydrocarbon-based wax such as a low molecular weight polyethylene, a low molecular weight polypropylene, a microcrystalline wax, a paraffin wax, or a Fishertropch wax; an oxide of an aliphatic hydrocarbon wax such as a polyethylene oxide wax and a block copolymer thereof; and a wax obtained by grafting an aliphatic hydrocarbon wax with a vinyl-based monomer such as styrene or acrylic acid.

The content of the release agent can be usually 1% by mass or more and 23% by mass or less, preferably 3% by mass or more and 16% by mass or less, and more preferably 5% by mass or more and 14% by mass or less with respect to the total mass of the toner. The content of the release agent within the above range achieves sufficient fixing separability.

1-1-3. Colorant

The first toner contains a yellow colorant.

The yellow colorant is not particularly limited, and a known yellow colorant can be used. Examples of the yellow colorant (pigment) include C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 180, and C.I. Pigment Yellow 185.

The first toner may contain a colorant other than the yellow colorant. Examples of the colorant other than the yellow colorant include a black colorant, an orange colorant, a magenta or red colorant, and a green or cyan colorant.

Examples of the black colorant include carbon black such as furnace black, channel black, acetylene black, thermal black, or lamp black, magnetite, and ferrite.

Examples of the orange colorant (pigment) include C.I. Pigment Orange 31 and C.I. Pigment Orange 43.

Examples of the magenta or red colorant (pigment) include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment. Red 48; 1, C.I. Pigment Red 53; 1, C.I. Pigment Red 57; 1, C.I. Pigment Red 122, C.I. Pigment Red 123, C.I. Pigment Red 139, C.I. Pigment Red 144, C.I. Pigment Red 149, C.I. Pigment Red 150, C.I. Pigment Red 166, C.I. Pigment Red 177, C.I. Pigment Red 178, C.I. Pigment Red 184, C.I. Pigment Red 222, and C.I. Pigment Red 269.

Examples of the green or cyan colorant (pigment) include C.I. Pigment Blue 15, C.I. Pigment Blue 15; 2, C.I. Pigment Blue 15; 3, C.I. Pigment Blue 15; 4, C.I. Pigment Blue 16, C.I. Pigment Blue 60, C.I. Pigment Blue 62, C.I. Pigment Blue 66, and C.I. Pigment Green 7.

The content of the colorant is preferably 1% by mass or more and 10% by mass or less, and more preferably 2% by mass or more and 15% by mass or less with respect to the total mass of the toner. Within such a range, color reproducibility of an image can be ensured.

The size of a colorant particle is not particularly limited, but a volume-based median diameter is preferably 10 nm or more and 1000 nm or less, and more preferably 50 nm or more and 500 nm or less from a viewpoint of obtaining high color reproducibility. The median diameter of the particle can be measured using "Nanotrac Wave 2-EX150" (manufactured by Microtrack Bell Co., Ltd.).

1-1-4. Other Components

Other components contained in the toner according to an embodiment of the present invention are not particularly limited and can be appropriately selected depending on a purpose. Examples thereof include various known external additives such as inorganic fine particles and organic fine particles, a charge control agent, and a developer.

The inorganic fine particles are generally used for the purpose of improving fluidity of the toner. Examples of the inorganic fine particles include fine particles of silica, alumina, titanium oxide, barium titanate, magnesium titanate, calcium titanate, strontium titanate, zinc oxide, silica sand, clay, mica, wollastonite, diatomaceous earth, cerium chloride, red iron oxide, chromium oxide, cerium oxide, antimony trioxide, magnesium oxide, zirconium oxide, silicon carbide, and silicon nitride. Among these fine particles, silica fine particles are preferable, and hydrophobized silica fine particles are particularly preferable.

The organic fine particles are used generally for the purpose of improving cleaning performance or transferability, and sometimes for the purpose of improving chargeability. Examples of the organic fine particles include fine particles of polystyrene, polymethylmethacrylate, polyvinylidene fluoride, and a polystyrene-acrylic copolymer.

The content of the external additive is preferably 0.05% by mass or more and 5% by mass or less, and more preferably 0.1% by mass or more and 3% by mass or less with respect to the total mass of the toner particles.

The charge control agent is generally used for the purpose of improving chargeability. Examples of the charge control agent include a known compound such as a nigrosine-based dye, a metal salt of naphthenic acid or a higher fatty acid, an alkoxylated amine, a quaternary ammonium salt, an azo-based metal complex, or a salicylic acid metal salt.

In the toner according to an embodiment of the present invention, the developer may be used as a magnetic or non-magnetic one-component developer, or may be mixed with a carrier to be used as a two-component developer. When the toner is used as a two-component developer, as the carrier, magnetic particles containing a conventionally known material, for example, a metal such as iron, ferrite, or magnetite, or an alloy formed by the metal and a metal such as aluminum or lead can be used. Ferrite particles are preferable because saturation magnetization and a surface shape of a magnetic particle can be easily adjusted depending on a composition.

The carrier may be a coated carrier obtained by coating surfaces of magnetic particles with a coating agent such as a resin, or may be a dispersion type carrier obtained by dispersing magnetic material fine powder in a binder resin. A volume-based median diameter of the carrier is preferably 20 μm or more and 100 μm or less, and more preferably 25 μm or more and 80 μm or less. When the median diameter is less than 20 μm, saturation magnetization may be small, and carrier adhesion may occur. When the median diameter is more than 100 μm, stacking or roughness of a halftone image may occur, and graininess may deteriorate. The volume-based median diameter (d50) of the carrier can be measured, for example, with a laser diffraction type particle size distribution measuring device "HELOS" (manufactured by SYMPATEC Gmbh) equipped with a wet type disperser.

1-2. Second Toner

The second toner only needs to contain a cyan colorant represented by general formula (1). The second toner is a toner containing a binder resin, a colorant, and a release agent like the first toner.

[Chemical formula 3]

(1)

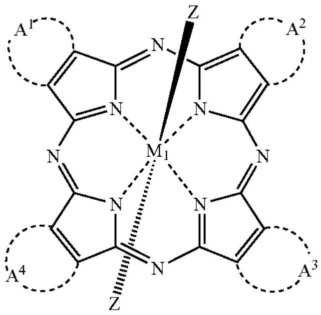

In general formula (1), M represents any one of a silicon atom, a germanium atom, a cobalt atom, and a zinc atom, $A^1$, $A^2$, $A^3$, and $A^4$ each independently represent an atomic group forming an aromatic ring which may have an electron-withdrawing substituent, and Zs each independently represent an aryloxy group having 6 or more and 18 or less carbon atoms, an alkoxy group having 1 or more and 22 or less carbon atoms, or a group represented by the following general formula (1-1).

[Chemical formula 4]

(1-1)

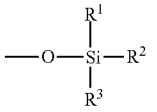

In general formula (1-1), $R^1$, $R^2$, and $R^3$ each independently represent an alkyl group, an aryl group, or an alkoxy group having 1 or more and 6 or less carbon atoms.

The cyan colorant represented by general formula (1) is a high chroma pigment of a phthalocyanine compound having a polytetraazaporfin structure having an axial ligand. By inclusion of the colorant represented by general formula (1) in the second toner, the colorant is easily dispersed uniformly in a toner matrix particle and in a fixed image, and a high chroma image can be obtained. In addition, it is difficult for the pigment to function as a nucleating agent because a dispersion diameter of the colorant is decreased. Furthermore, when the vinyl-based resin which is a matrix is cooled, crystallization starts in a state of high elasticity. Therefore, it is considered that excessive growth of domains of the crystalline resin can be suppressed to improve fold fixability.

1-2-1. Binder Resin

The binder resin contained in the second toner can be selected from similar resins to the binder resin contained in the first toner.

However, in the second toner, the content of the crystal nucleating agent moiety with respect to the total mass of the crystalline resin excluding the crystal nucleating agent is preferably less than 3% by mass, and more preferably less than 1% by mass from a viewpoint of improving fold fixability and low-temperature fixability.

The binder resin contained in the second toner can be similar to that described for the first toner except for the content of the crystal nucleating agent, and therefore detailed description thereof will be omitted.

1-2-2. Release Agent The second toner in the present invention contains a release agent containing a hydrocarbon wax.

The release agent can be similar to that described for the first toner, and therefore detailed description thereof will be omitted.

1-2-3. Colorant

The second toner contains a cyan colorant represented by general formula (1).

A toner using the compound represented by the above general formula (1) as a colorant exhibits better separability than a toner using a phthalocyanine compound having no axial ligand as a colorant. It is presumed that this is because the compound of general formula (1) has a bulky substituent (Z), therefore the colorant is easily dispersed uniformly in a toner matrix particle and in a fixed image, the wax (release agent) in the toner is likely to seep to an image surface at the time of fixing, and therefore the amount of the release agent inside the image is reduced to improve fold fixability.

In the above general formula (1), M represents any one of a silicon atom (Si), a germanium atom (Ge), a cobalt atom (Co) and a zinc atom (Zn). M is preferably a silicon atom (Si) from a viewpoint of excellent color of a formed image.

In the above general formula (1), $A^1$, $A^2$, $A^3$, and $A^4$ each independently represent an atomic group forming an aromatic ring which may have an electron-withdrawing substituent. Examples of the electron-withdrawing substituent include a chloro group (—Cl), a methyl chloride halide group ($—CClX_2$), a trifluoromethyl group ($—CF_3$), and a nitro group ($—NO_2$). Note that "X" in the methyl chloride halide group ($—CClX_2$) represents a halogen atom.

In the above general formula (1), Zs each represent an aryloxy group having 6 or more and 18 or less carbon atoms, an alkoxy group having 1 or more and 22 or less carbon atoms, or a group represented by general formula (1-1). Z is preferably a group represented by general formula (1-1), more preferably an n-propyl group, an isopropyl group, an n-butyl group, an isobutyl group, or a t-butyl group from a viewpoint of ease of synthesis and increasing a bulk of a molecule.

In the above general formula (1-1), $R^1$, $R^2$, and $R^3$ each independently represent an alkyl group, an aryl group, or an alkoxy group having 1 or more and 6 or less carbon atoms. $R^1$, $R^2$, and $R^3$ are each preferably an alkyl group, an aryl group or an alkoxy group having 1 or more and 6 or less carbon atoms, and more preferably an n-propyl group, an isopropyl group, an n-butyl group, an isobutyl group, or a t-butyl group.

As the colorant, the compound represented by general formula (1) may be used singly, or two or more of the compounds may be used in combination. A known colorant may be used in combination with the above colorant. In particular, the compound represented by general formula (1) has high molecular absorbency, and therefore exhibits favorable color reproducibility with a smaller amount of addition than that in prior art. The ratio of the compound represented by general formula (1) in the colorant is not particularly limited as long as the compound is blended to such an extent that the compound can exhibit its function. Colorants for obtaining toners of colors can be used singly or in combination of two or more types thereof for each of the colors.

The second toner may contain a colorant other than the cyan colorant. Examples of the colorant other than the cyan colorant include a black colorant, an orange or yellow colorant, a magenta or red colorant, and a green colorant. Examples of these colorants can be similar to those described for the first toner, and therefore detailed description thereof will be omitted.

The content and particle size of the colorant contained in the second toner can be similar to those described for the first toner, and therefore detailed description thereof will be omitted.

1-2-4. Other Components

Other components contained in the second toner can be appropriately selected according to a purpose in a similar manner to those described for the other components contained in the first toner, and therefore detailed description thereof will be omitted.

1-3. Third Toner

The toner set according to an embodiment of the present invention may contain a third toner containing a magenta colorant. The third toner contains a binder resin containing a vinyl-based resin and a crystalline resin, and a release agent containing a hydrocarbon wax, in which the content of the vinyl-based resin with respect to the total mass of the binder resin is 50% by mass or more.

1-3-1. Binder Resin

The binder resin contained in the third toner can be selected from resins similar to the binder resin contained in the first toner.

However, in the third toner, the content of the crystal nucleating agent moiety with respect to the total mass of the crystalline resin excluding the crystal nucleating agent is preferably less than 3% by mass, and more preferably less than 1% by mass from a viewpoint of improving fold fixability and low-temperature fixability.

The binder resin contained in the third toner can be similar to that described for the first toner except for the content of the crystal nucleating agent, and therefore detailed description thereof will be omitted.

1-3-2. Release Agent

The third toner in the present invention contains a release agent containing a hydrocarbon wax.

The release agent can be similar to that described for the first toner, and therefore detailed description thereof will be omitted.

1-3-3. Colorant

The third toner contains a magenta colorant. The colorant contained in the third toner preferably contains a compound obtained by a reaction between a colorant represented by general formula (2) and a metal-containing compound represented by general formula (3) in an amount of 50% by mass or more with respect to the total mass of the magenta colorant from a viewpoint of improving low-temperature fixability and fold fixability.

[Chemical formula 5]

(2)

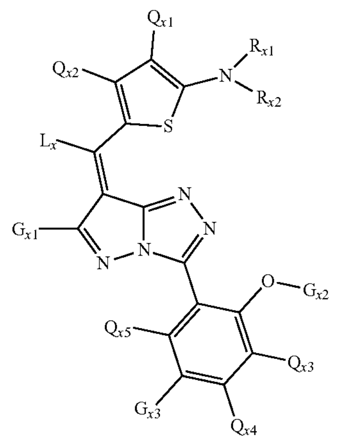

In general formula (2), $R_{x1}$ and $R_{x2}$ each independently represent a substituted or unsubstituted linear, branched, or cyclic alkyl group having 1 or more and 20 or less carbon atoms, Lx represents a hydrogen atom or a substituted or unsubstituted linear, branched, or cyclic alkyl group having 1 or more and 20 or less carbon atoms, $G_{x1}$ represents a substituted or unsubstituted linear, branched, or cyclic alkyl group having 2 or more and 20 or less carbon atoms, $G_{x2}$ represents a substituted or unsubstituted linear or branched alkyl group having 1 or more and 5 or less carbon atoms, Go represents a hydrogen atom, a halogen atom, a group represented by $G_{x4}$-CO—NH—, or a group represented by $G_{x5}$-N($G_{x6}$)—CO—, in which $G_{x4}$ represents a substituent, $G_{x5}$ and $G_{x6}$ each independently represent a hydrogen atom or a substituent, and $Q_{x1}$, $Q_{x2}$, $Q_{x3}$, $Q_{x4}$, and $Q_{x5}$ each independent represent a hydrogen atom or a substituent.

[Chemical formula 6]

(3)

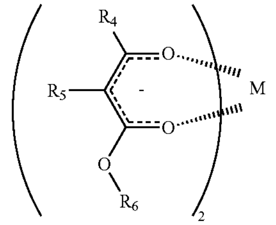

In general formula (3), $R_4$ represents a substituted or unsubstituted linear, branched, or cyclic alkyl group having 1 or more and 20 or less carbon atoms, $R_5$ represents a hydrogen atom, an alkoxycarbonyl group, an arylcarbonyl group, an aryloxycarbonyl group, a sulfamoyl group, a sulfinyl group, an alkylsulfonyl group, an arylsulfonyl group, an acyl group, a nitrophenyl group, a halogen atom, or a cyano group, $R_6$ represents a substituted or unsubstituted aromatic hydrocarbon-containing group having 9 or more and 120 or less carbon atoms, and M represents a divalent metal element.

In the above general formula (2), $R_{x1}$ and $R_{x2}$ each independently represent a substituted or unsubstituted linear, branched, or cyclic alkyl group having 1 or more and 20 or less carbon atoms. Specific examples thereof include a methyl group, an ethyl group, an n-propyl group, an isopropyl group, a 2-methylpropyl group, an n-butyl group, an isobutyl group, a sec-butyl group, a tert-butyl group, an n-pentyl group, an iso-amyl group, a tert-pentyl group, a neopentyl group, an n-hexyl group, a 3-methylpentan-2-yl group, a 3-methylpentan-3-yl group, a 4-methylpentyl group, a 4-methylpentan-2-yl group, a 1,3-dimethylbutyl group, a 3,3-dimethylbutyl group, a 3,3-dimethylbutan-2-yl group, an n-heptyl group, a 1-methylhexyl group, a 3-methylhexyl group, a 4-methylhexyl group, a 5-methylhexyl group, a 1-ethylpentyl group, a 1-(n-propyl) butyl group, a 1,1-dimethylpentyl group, a 1,4-dimethylpentyl group, a 1,1-diethylpropyl group, a 1,3,3-trimethylbutyl group, a 1-ethyl-2,2-dimethylpropyl group, an n-octyl group, a 2-ethylhexyl group, a 2-methylhexan-2-yl group, a 2,4-dimethylpentan-3-yl group, a 1,1-dimethylpentan-1-yl group, a 2,2-dimethylhexan-3-yl group, a 2,3-dimethylhexan-2-yl group, a 2,5-dimethylhexan-2-yl group, a 2,5-dimethylhexan-3-yl group, a 3,4-dimethylhexan-3-yl group, a 3,5-dimethylhexan-3-yl group, a 1-methylheptyl group, a 2-methylheptyl group, a 5-methylheptyl group, a 2-methylheptan-2-yl group, a 3-methylheptan-3-yl group, a 4-methylheptan-3-yl group, a 4-methylheptan-4-yl group, a 1-ethylhexyl group, a 2-ethylhexyl group, a 1-propylpentyl group, a 2-propylpentyl group, a 1,1-dimethylhexyl group, a 1,4-dimethylhexyl group, a 1,5-dimethylhexyl group, a 1-ethyl-1-methylpentyl group, a 1-ethyl-4-methylpentyl group, a 1,1,4-trimethylpentyl group, a 2,4,4-trimethylpentyl group, a 1-isopropyl-1,2-dimethylpropyl group, a 1,1,3,3-tetramethylbutyl group, an n-nonyl group, a 1-methyloctyl group, a 6-methyloctyl group, a 1-ethylheptyl group, a 1-(n-butyl) pentyl group, a 4-methyl-1-(n-propyl)) pentyl group, a 1,5,5-trimethylhexyl group, a 1,1,5-trimethylhexyl group, a 2-methyloctan-3-yl group, an n-decyl group, a 1-methyl nonyl group, a 1-ethyloctyl group, a 1-(n-butyl) hexyl group, a 1,1-dimethyloctyl group, a 3,7-dimethyloctyl group, an n-undecyl group, a 1-methyldecyl group, a 1-ethylnonyl group, an n-dodecyl group, a 1-methylundecyl group, an n-tridecyl group, an n-tetradecyl group, a 1-methyltridecyl group, an n-pentadecyl group, an n-hexadecyl group, an n-heptadecyl group, an n-octadecyl group, an n-nonadecyl group, an n-eicosyl group, a cyclopropyl group, a cyclobutyl group, a cyclopentyl group, a cyclohexyl group, and a 4-tert-butyl-cyclohexyl group.

One or more hydrogen atoms of each of the above alkyl groups may be replaced with substituents. Examples of the substituents include an alkenyl group (for example, a vinyl group or an allyl group), an alkynyl group (for example, an ethynyl group or a propargyl group), an aromatic hydrocarbon group (for example, a phenyl group or a naphthyl group), an aromatic heterocyclic group (for example, a furyl group, a thienyl group, a pyridyl group, a pyridazyl group, a pyrimidyl group, a pyrazyl group, a triazyl group, an imidazolyl group, a pyrazolyl group, a thiazolyl group, a benzimidazolyl group, a benzoxazolyl group, a quinazolyl group, or a phthalazyl group), a heterocyclic group (for example, a pyrrolidyl group, an imidazolidyl group, a morpholyl group, or an oxazozolidyl group), an alkoxy group (for example, a methoxy group, an ethoxy group, a propyloxy group, a pentyloxy group, a hexyloxy group, an octyloxy group, or a dodecyloxy group), a cycloalkoxy group (for example, a cyclopentyloxy group or a cyclohexyloxy group), an aryloxy group (for example, a phenoxy group or a naphthyloxy group), an alkylthio group (for example, a methylthio group, an ethylthio group, a propylthio group, a pentylthio group, a hexylthio group, an octylthio group, or a dodecylthio group), a cycloalkylthio group (for example, a cyclopentylthio group or a cyclohexylthio group), an arylthio group (for example, a phenylthio group or a naphthylthio group), an alkoxycarbonyl group (for example, a methyloxycarbonyl group, an ethyloxycarbonyl group, a butyloxycarbonyl group, an octyloxycarbonyl group, or a dodecyloxycathonyl group), an alkoxyalkylene ether group (for example, a methoxyethylene ether group), an alkylaminocarbonyl group (for example, a diethylamino carbonyl group), an aryloxycarbonyl group (for example, a phenyloxycarbonyl group or a naphthyloxycarbonyl group), a phosphoryl group (for example, dimethoxy phosphoryl or diphenyl phosphoryl), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group, or a 2-pyridylaminosulfonyl group), an acyl group (for example, an acetyl group, an ethylcarbonyl group, a propylcarbonyl group, a pentylcarbonyl group, a cyclohexylcarbonyl group, an octylcathonyl group, a 2-ethylhexylcarbonyl group, a dodecylcarbonyl group, a phenylcarbonyl group, a naphthylcarbonyl group, or a pyridylcarbonyl group), an acyloxy group (for example, an acetyloxy group, an ethylcarbonyloxy group, a butylcarbonyloxy group, an octylcarbonyloxy group, a dodecylcarbonyloxy group, or a phenylcarbonyloxy group), an amido group (for example, a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcathonylamino group, a dodecylcarbonylamino group, a phenylcarbonylamino group, or a naphthylcarbonylamino group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group, or a 2-pyridylaminocarbonyl group), a ureido group (for example, a methylureido group, an ethylureido group, a pentylureido group, a cyclohexylureido group, an octylureido group, a dodecylureido group, a phenylureido group, a naphthylureido group, or a 2-pyridylaminoureido group), a sulfinyl group (for example, a methylsulfinyl group, an ethylsulfinyl group, a butylsulfinyl group, a cyclohexylsulfinyl group, a 2-ethylhexylsulfinyl group, a dodecysulfinyl group, a phenylsulfinyl group, a naphthylsulfinyl group, or a 2-pyridylsulfinyl group), an alkylsulfonyl group (for example, a methylsulfonyl group, an ethylsulfonyl group, a butylsulfonyl group, a cyclohexylsulfonyl group, a 2-ethylhexylsulfonyl group, or a dodecylsulfonyl group), an arylsulfonyl group (for example, a phenylsulfonyl group, a naphthylsulfonyl group, or a 2-pyridylsulfonyl group), an amino group (for example, an amino group, an ethylamino group, a dimethylamino group, a butylamino group, a dibutylamino group, a cyclopentylamino group, a 2-ethylhexylamino group, a dodecylamino group, an anilino group, a naphthylamino group, or a 2-pyridylamino group), an azo group (for example, a phenylazo group), an alkylsulfonyloxy group (for example, a methane sulfonyloxy group), a cyano group, a nitro group, a halogen atom (for example, a fluorine atom, a chlorine atom, or a bromine atom), and a hydroxy group. These groups may further have substituents. Among these substituents, an aromatic hydrocarbon group (preferably having 6 or more and 20 or less carbon atoms), an alkoxy group (preferably having 1 or more and 10 or less carbon atoms), a cycloalkoxy group (preferably having 4 or more and 10 or less carbon atoms), a halogen atom, a hydroxy group, an alkoxyalkylene ether group (preferably an alkoxy group having 1 to 10 carbon atoms and an alkylene group having 1 or more and 10 or less carbon atoms), or an alkylaminocarbonyl group (preferably an alkyl group having 1 or more and 10 or less carbon atoms) is preferable.

$R_{x1}$ and $R_{x2}$ are each independently preferably an unsubstituted alkyl group or an alkoxy group-substituted alkyl group, and more preferably an unsubstituted alkyl group. In addition, the total number of carbon atoms contained in the alkyl group used for $R_{x1}$ and carbon atoms contained in the alkyl group used for $R_{x2}$ is preferably 2 or more.

In the above general formula (2), $G_{x1}$ represents a substituted or unsubstituted linear, branched, or cyclic alkyl group having 2 or more and 20 or less carbon atoms. Specific examples of the alkyl group are similar to those of the alkyl groups used for $R_{x1}$ and $R_{x2}$ excluding a methyl group, and therefore detailed description thereof will be omitted here. In addition, specific examples of the substituents are similar to those of the substituents that can be used for $R_{x1}$ and $R_{x2}$, and therefore detailed description thereof will be omitted here. $G_{x1}$ is preferably a branched alkyl group, more preferably a tertiary alkyl group, still more preferably an isopropyl group or a t-butyl group, and particularly preferably a t-butyl group.

In the above general formula (2), $G_{x2}$ represents a substituted or unsubstituted linear or branched alkyl group having 1 or more and 5 or less carbon atoms. Specific examples of the alkyl group used for $G_{x2}$ include a methyl group, an ethyl group, an n-propyl group, an isopropyl group, an n-butyl group, an isobutyl group, a sec-butyl group, a tert-butyl group, an n-pentyl group, an iso-amyl group, a tert-pentyl group, and a neopentyl group. Specific examples of the substituents are similar to those of the substituents that can be used for $R_{x1}$ and $R_{x2}$, and therefore detailed description thereof will be omitted here. $G_{x2}$ is preferably a methyl group or an ethyl group from a viewpoint of obtaining the effects of the present invention more effectively.

In the above general formula (2), $G_{x3}$ represents a hydrogen atom, a halogen atom, a group represented by $G_{x4}$-CO—NH—, or a group represented by $G_x$s-N(GO-CO—, in which case $G_{x4}$ is a substituent, and $G_{x5}$ and $G_{x6}$ each independently represent a hydrogen atom or a substituent. Specific examples of the substituents used for $G_{x4}$, $G_{x5}$, and $G_{x6}$ include, in addition to the substituents that can be used for $R_{x1}$ and $R_{x2}$, a linear, branched, or cyclic alkyl group having 1 or more and 20 or less carbon atoms. Go is preferably a hydrogen atom or a diethylamine carbonyl group.

In the above general formula (1), $Q_{x1}$, $Q_{x2}$, $Q_{x3}$, $Q_{x4}$, and $Q_{x5}$ each independently represent a hydrogen atom or a substituent. Specific examples of the substituents used for $Q_{x1}$, $Q_{x2}$, $Q_{x3}$, $Q_{x4}$, and $Q_{x5}$ include, in addition to the substituents that can be used for $R_{x1}$ and $R_{x2}$, a linear, branched, or cyclic alkyl group having 1 or more and 20 or less carbon atoms. $Q_{x1}$, $Q_{x2}$, $Q_{x3}$, $Q_{x4}$, and $Q_{x5}$ are each independently preferably a hydrogen atom, an alkyl group, a halogen atom, an alkoxy group (preferably having 1 or more and 10 or less carbon atoms), or an aryl group, and are each more preferably a hydrogen atom.

Examples of the colorant represented by the above general formula (2) include the following compounds.

[Chemical Formula 7]

2-1

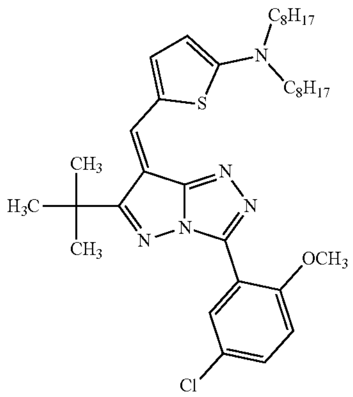

2-2

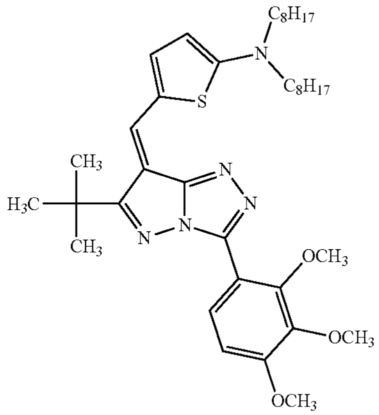

2-3

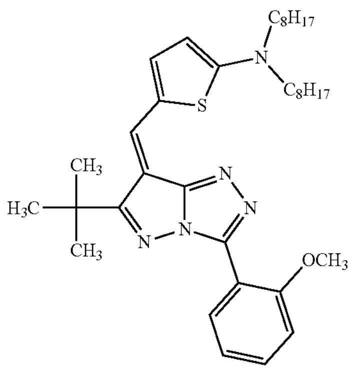

2-4
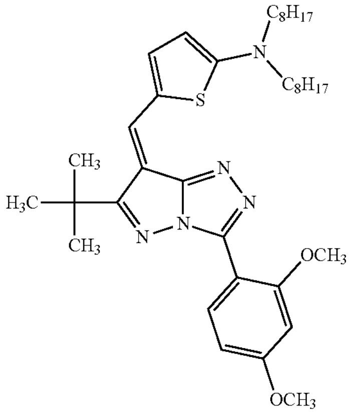
2-5
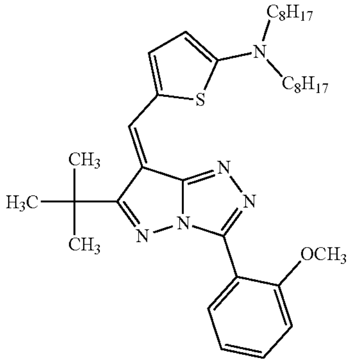
2-6
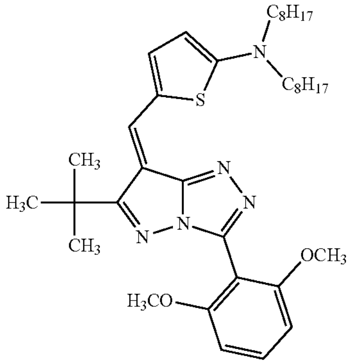
2-7
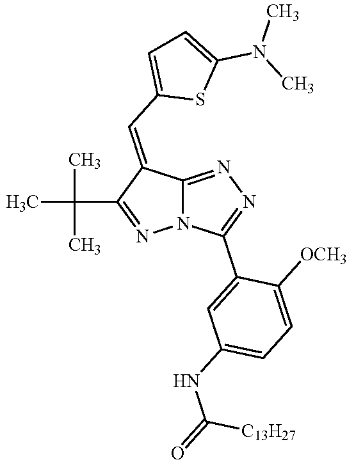
2-8
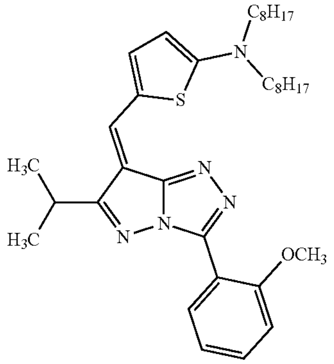
2-9
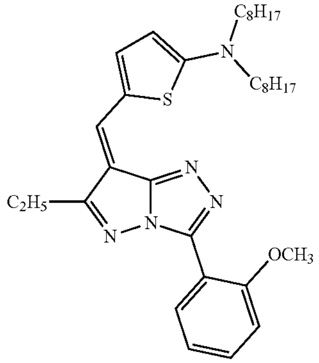
2-10
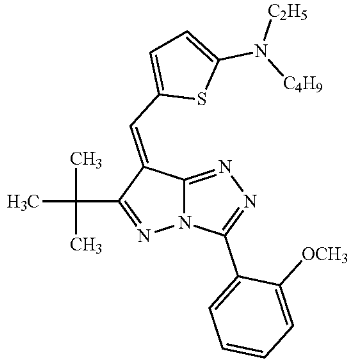
2-11
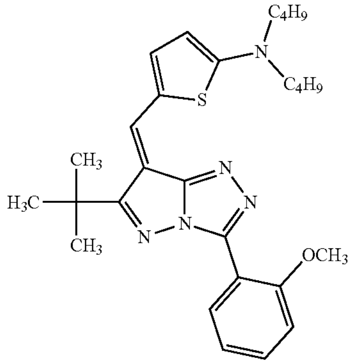

-continued
2-12
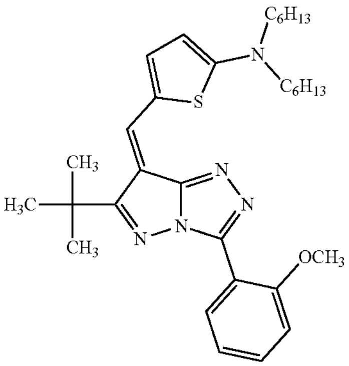
[Chemical formula 8]
2-13
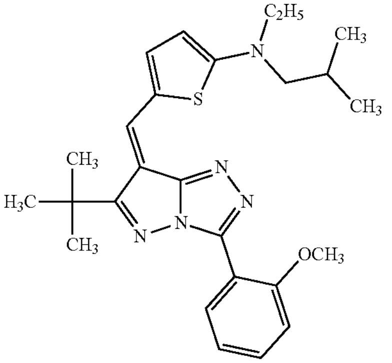
2-14
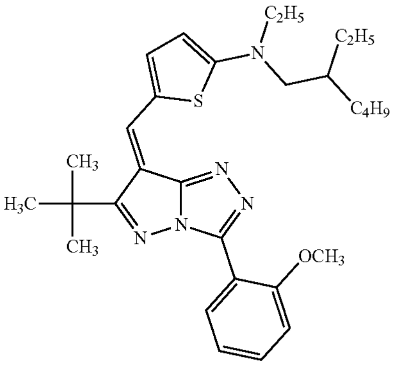
2-15
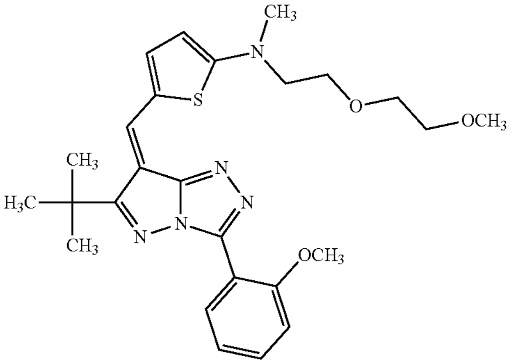
-continued
2-16
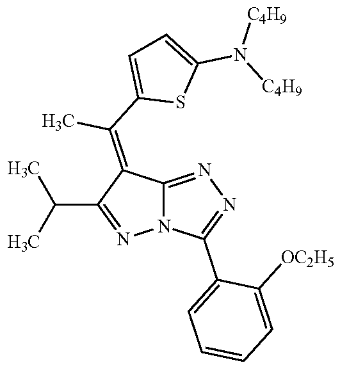
2-17
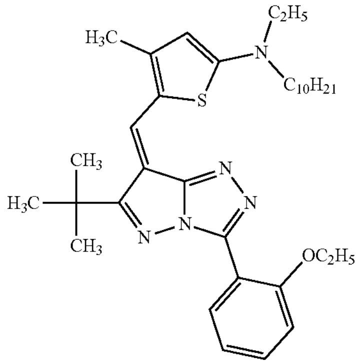
2-18
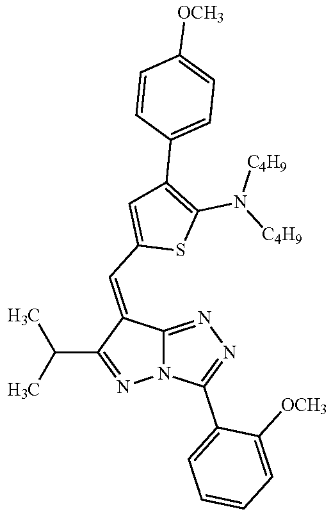

-continued
2-19
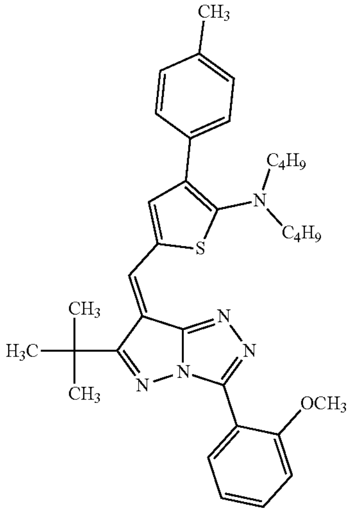
2-20
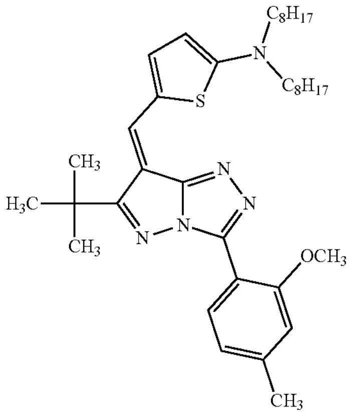
2-21
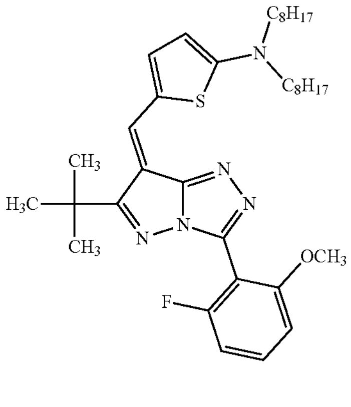
-continued
[Chemical formula 9]
2-22
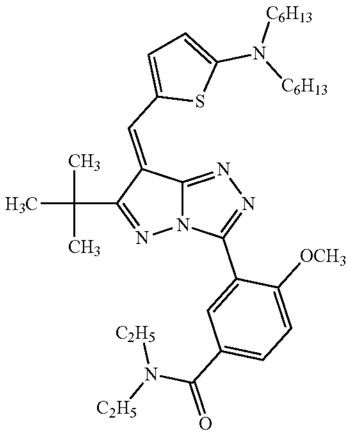
2-23
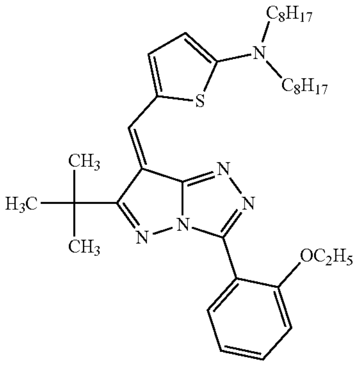
2-24
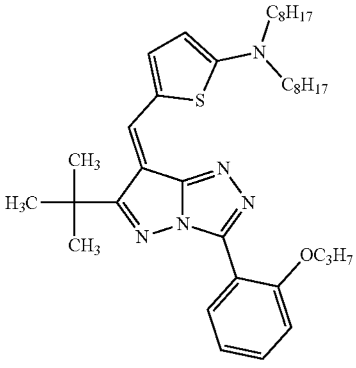
2-25
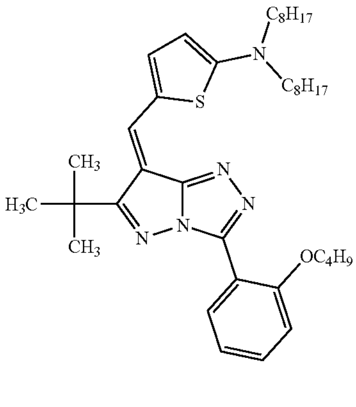

-continued 2-26

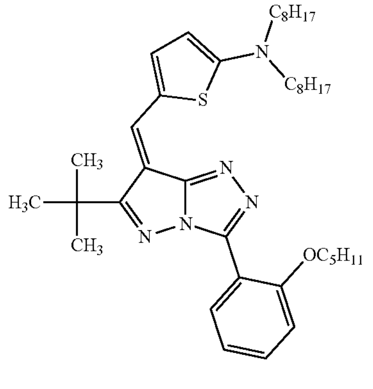

The colorant represented by the above general formula (2) can be synthesized by referring to a conventionally known method described in JP 2016-130806 A.

In the above general formula (3), $R_4$ represents a substituted or unsubstituted linear, branched, or cyclic alkyl group having 1 or more and 20 or less carbon atoms. Specific examples of the alkyl group are similar to the alkyl groups used for $R_{x1}$ and $R_{x2}$ in formula (2) of the section of the colorant, and therefore detailed description thereof will be omitted here.

One or more hydrogen atoms of each of the above alkyl groups may be replaced with substituents. Examples of the substituents include an alkenyl group (for example, a vinyl group or an allyl group), an alkynyl group (for example, an ethynyl group or a propargyl group), an aryl group (for example, a phenyl group or a naphthyl group, or a 4-octyloxybenzene), a heterocyclic aryl group (for example, a furyl group, a thienyl group, a pyridyl group, a pyridazyl group, a pyrimidyl group, a pyrazyl group, a triazyl group, an imidazolyl group, a pyrazolyl group, a thiazolyl group, a benzimidazolyl group, a benzoxazolyl group, a quinazolyl group, or a phthalazyl group), a heterocyclic group (for example, a pyrrolidyl group, an imidazolidyl group, a morpholyl group, or an oxazozolidyl group), an alkoxy group (for example, a methoxy group, an ethoxy group, a propyloxy group, a pentyloxy group, a hexyloxy group, an octyloxy group, or a dodecyloxy group, a cyclopentyloxy group, or a cyclohexyloxy group), an aryloxy group (for example, a phenoxy group or a naphthyloxy group), an alkylthio group (for example, a methylthio group, an ethylthio group, a propylthio group, a pentylthio group, a hexylthio group, an octylthio group, or a dodecylthio group, a cyclopentylthio group, or a cyclohexylthio group), an arylthio group (for example, a phenylthio group or a naphthylthio group), an alkoxycarbonyl group (for example, a methyloxycarbonyl group, an ethyloxycarbonyl group, a butyloxycarbonyl group, an octyloxycarbonyl group, or a dodecyloxycarbonyl group), an aryloxycarbonyl group (for example, a phenyloxycarbonyl group or a naphthyloxycarbonyl group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group, or a 2-pyridylaminosulfonyl group), an acyl group (for example, an acetyl group, an ethylcathonyl group, a propylcarbonyl group, a pentylcarbonyl group, a cyclohexylcarbonyl group, an octylcarbonyl group, a 2-ethylhexylcathonyl group, a dodecylcarbonyl group, a phenylcarbonyl group, a naphthylcarbonyl group, or a pyridylcarbonyl group), an acyloxy group (for example, an acetyloxy group, an ethylcarbonyloxy group, a butylcarbonyloxy group, an octylcarbonyloxy group, a dodecylcarbonyloxy group, or a phenylcarbonyloxy group), an amido group (for example, a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group, or a naphthylcarbonylamino group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group, or a 2-pyridylaminocarbonyl group), a ureido group (for example, a methylureido group, an ethylureido group, a pentylureido group, a cyclohexylureido group, an octylureido group, a dodecylureido group, a phenylureido group, a naphthylureido group, or a 2-pyridylaminoureido group), a sulfinyl group (for example, a methylsulfinyl group, an ethylsulfinyl group, a butylsulfinyl group, a cyclohexylsulfinyl group, a 2-ethylhexylsulfinyl group, a dodecysulfinyl group, a phenylsulfinyl group, a naphthylsulfinyl group, or a 2-pyridylsulfinyl group), an alkylsulfonyl group (for example, a methylsulfonyl group, an ethylsulfonyl group, a butylsulfonyl group, a cyclohexylsulfonyl group, a 2-ethylhexylsulfonyl group, or a dodecylsulfonyl group), an arylsulfonyl group (for example, a phenylsulfonyl group, a naphthylsulfonyl group, or a 2-pyridylsulfonyl group), an amino group (for example, an amino group, an ethylamino group, a dimethylamino group, a butylamino group, a cyclopentylamino group, a 2-ethylhexylamino group, a dodecylamino group, an anilino group, a naphthylamino group, or a 2-pyridylamino group), a cyano group, a nitro group, and a halogen atom (for example, a chlorine atom, a bromine atom, fluorine atom, or an iodine atom). These groups may further have similar substituents.

$R_4$ is preferably an alkyl group having 1 or more and 4 or less carbon atoms, more preferably a linear alkyl group having 1 or more and 4 or less carbon atoms, still more preferably a methyl group or an ethyl group, and particularly preferably a methyl group.

In the above general formula (3), $R_5$ represents a hydrogen atom, an alkoxycarbonyl group, an arylcarbonyl group, an aryloxycarbonyl group, a sulfamoyl group, a sulfinyl group, an alkylsulfonyl group, an arylsulfonyl group, an acyl group, a nitrophenyl group, a halogen atom, or a cyano group. Specific examples thereof include: an alkoxycarbonyl group such as a methyloxycarbonyl group, an ethyloxycarbonyl group, a butyloxycarbonyl group, an octyloxycarbonyl group, or a dodecyloxycarbonyl group; an arylcarbonyl group such as a phenylcarbonyl group; an aryloxycathonyl group such as a phenyloxycarbonyl group or a naphthyloxycarbonyl group; a sulfamoyl group of an alkylsulfonylamino group such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, or a dodecylaminosulfonyl group, or an arylsulfonylamino group such as a phenylaminosulfonyl group, a 3-methyl-4-dodecyloxy-5-t-butylphenylaminosulfonyl group, a naphthylaminosulfonyl group, or a 2-pyridylaminosulfonyl group; a sulfinyl group such as a methyl sulfinyl group, an ethyl sulfinyl group, a butyl sulfinyl group, a cyclohexyl sulfinyl group, a 2-ethylhexyl sulfinyl group, a dodecyl sulfinyl group, a phenyl sulfinyl group, a naphthyl sulfinyl group, or a 2-pyridyl sulfinyl group; an alkylsulfonyl group such as a methylsulfonyl group, an ethylsulfonyl group, a butylsulfonyl group, a cyclohexylsulfonyl group, a 2-ethylhexylsulfonyl group, or a dodecylsulfonyl group; an arylsulfonyl group such as a phenylsulfonyl group, a 4-methylphenylsulfonyl group, a naphthylsulfonyl group, or a 2-pyridylsulfonyl group; an acyl group such as an acetyl group, an ethylcarbonyl group, a propylcarbonyl group, a pentylcarbonyl group, a hexylcarbonyl group, a cyclohexylcarbonyl group, an octylcarbonyl group, a 2-ethylhexylcalbonyl group, a dodecylcarbonyl group, a phenylcarbonyl group, a naphthylcarbonyl group, or a pyridylcarbonyl group; a halogen atom (for example, a chlorine atom, a bromine atom, a fluorine atom, or an iodine atom), and a cyano group.

$R_5$ is preferably an alkoxycarbonyl group (preferably having 2 or more and 10 or less carbon atoms), an arylcarbonyl group (preferably having 2 or more and 10 or less carbon atoms), an alkylsulfonyl group (preferably having 7 or more and 10 or less carbon atoms), an arylsulfonyl group (preferably having 6 or more and 10 or less carbon atoms), an acyl group (preferably having 2 or more and 10 or less carbon atoms), or a cyano group, more preferably an alkoxycarbonyl group (preferably having 2 or more and 10 or less carbon atoms), an acyl group (preferably having 2 or more and 10 or less carbon atoms), or a cyano group, and still more preferably a cyano group.

In the above general formula (3), $R_6$ represents a substituted or unsubstituted aromatic hydrocarbon-containing group having 9 or more and 120 or less carbon atoms.

Here, the aromatic hydrocarbon-containing group having 9 or more and 120 or less carbon atoms refers to a group having 9 or more and 120 or less carbon atoms in $R_6$ and having an aromatic hydrocarbon structure at any position in $R_6$. Examples of the aromatic hydrocarbon structure include an aryl group (for example, a phenyl group or a naphthyl group). For example, when the aromatic hydrocarbon structure is a phenyl group, the phenyl group forms $R_6$ together with any substituent having 3 or more carbon atoms. In this case, $R_6$ may have three or more substituents each having one carbon atom, or may have one or more substituents each having one carbon atom and one or more substituents each having two carbon atoms. The total number of carbon atoms in $R_6$ is preferably 9 or more and 40 or less, more preferably 12 or more and 40 or less, and still more preferably 14 or more and 30 or less. $R_6$ is preferably a group represented by the following formula (4).

[Chemical formula 10]

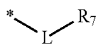

(4)

In the above general formula (4), L represents a group formed by combining a linear or branched alkylene group having 1 or more and 15 or less carbon atoms with one or more divalent linking groups selected from the group consisting of $-SO_2O-$, $-OSO_2-$, $-SO_2-$, $-CO-$, $-O-$, $-S-$, $-SO_2NH-$, $-NHSO_2-$, $-CONH-$, $-NHCO-$, $-COO-$, and $-OOC-$. At *, $R_6$ is bonded to an oxygen atom adjacent to $R_6$ in general formula (2).

Specific examples of the linear or branched alkylene group having 1 or more and 15 or less carbon atoms include a methylene group, an ethylene group, a trimethylene group, a tetramethylene group, a propylene group, an ethylethylene group, a pentamethylene group, a hexamethylene group, a 2,2,4-trimethylhexamethylene group, a heptamethylene group, an octamethylene group, a nonamethylene group, a decamethylene group, an undecamethylene group, a dodecamethylene group, a tridecamethylene group, a tetradecamethylene group, and a pentadecamethylene group. L may have a substituent, and examples of the substituent include a group similar to the substituent used for $R_4$ in the above general formula (3).

The divalent linking group represented by L is preferably an alkylene group or a group containing an alkylene group. The group containing an alkylene group only needs to contain an alkylene group at any position in the divalent linking group represented by L, and specifically refers to a group formed by combining an alkylene group with one or more divalent linking groups selected from the group consisting of $-SO_2O-$, $-OSO_2-$, $-SO_2-$, $-CO-$, $-O-$, $-S-$, $-SO_2NH-$, $-NHSO_2-$, $-CONH-$, $-NHCO-$, $-COO-$, and $-OOC-$.

L is preferably an alkylene group having 1 or more and 10 or less carbon atoms, an $-R_9-O-$ group, an $-R_9-CO-$ group, an $-R_9-NHCO-$ group, an $-R_9-SO_2-$ group, an $-R_9-COS-$ group, an $-NH-SO_2-$ group, an $-NH-SO_2-R_9-$ group, or an $-R_9-O-R_9-O-R_9-$ group, in which $-R_9-$ represents an alkylene group having 1 or more and 10 or less carbon atoms.

$R_7$ represents an aryl group (for example, a phenyl group or a naphthyl group). Specific examples of the divalent linking group represented by L are describe below, but the present invention is not limited thereto. At *, L is bonded to an oxygen atom adjacent to $R_3$ in the above general formula (2) or $R_7$.

$R_6$ and $R_7$ each may have a substituent, and examples of the substituent include a group similar to the substituent used for $R_4$ in the above general formula (3).

Preferable examples of the substituents for substitution in L, $R_6$, and $R_7$ include an alkyl group (preferably having 1 or more and 20 or less carbon atoms), an alkoxy group (preferably having 1 or more and 20 or less carbon atoms), an aryloxy group, an alkylthio group, an arylthio group, an allkoxycarbonyl group (preferably having 2 or more and 20 or less carbon atoms), an aryloxycarbonyl group, a sulfamoyl group, an acyl group, an acyloxy group, an amide group, an alkylaminocarbonyl group (preferably having 2 or more and 20 or less carbon atoms), a carbamoyl group, an alkylsulfonyl group, an alylsulfonyl group, an amino group, a cyano group, a nitro group, and a halogen atom. More preferable examples thereof include an alkyl group, an alkoxy group, an acyloxy group, an alkoxycarbonyl group, an alyloxycarbonyl group, a sulfamoyl group, an acyl group, an acyloxy group, an amide group, and a carbamoyl group. Still more preferable examples thereof include an alkyl group, an alkoxy group, an aryloxy group, an alkoxycarbonyl group, an acyloxy group, and an amide group.

$R_7$ is preferably a phenyl group, more preferably a phenyl group having a substituent, still more preferably a phenyl group having an alkyl group, an alkoxy group, an aryloxy group, an alkoxycarbonyl group, an acyloxy group, or an amide group, and particularly preferably a phenyl group having an alkyl group or an alkoxy group.

$R_6$ is more preferably a group represented by the following general formula (4-1) or (4-2).

[Chemical formula 11]

(4-1)

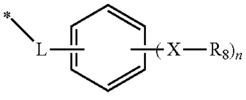

(4-2)

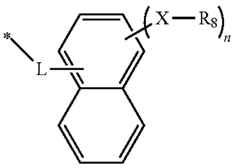

In the general formulas (4-1) and (4-2), L and * represent groups synonymous with L and * in the above general formula (4), respectively, Xs each independently represent —O—·, —NHCO—, or —COO—, $R_8$ represents a linear or branched alkyl group having 1 or more and 30 or less carbon atoms, and n represents an integer of 0 to 3.

$R_8$ is preferably an alkyl group having 1 or more and 20 or less carbon atoms, and more preferably an alkyl group having 1 or more and 10 or less carbon atoms. $R_8$ may have a substituent, and examples of the substituent include a group synonymous with the substituent used for $R_1$ in the above general formula (3). $R_8$ is preferably a linear alkyl group, and more preferably contains only a carbon atom and a hydrogen atom. n is preferably 0 or 1.

L is preferably an alkylene group having 1 or more and 10 or less carbon atoms, an —$R_9$—O— group, an —$R_9$—CO— group, an —$R_9$—NHCO— group, an —$R_9$—$SO_2$— group, an —$R_9$—COS— group, an —NH—$SO_2$— group, an —NH—$SO_2$—$R_9$— group, or an —$R_9$—O—$R_9$—O—$R_9$— group, in which —$R_9$— represents an alkylene group having 1 to 10 carbon atoms. More preferably, L is an alkylene group having 1 or more and 6 or less carbon atoms, or an —$R_9$—O— group (in which $R_9$ preferably has 1 or more and 5 or less carbon atoms).

In the above general formula (3), M represents a divalent metal element. Examples of the divalent metal include iron, magnesium, nickel, cobalt, copper, palladium, zinc, vanadium, titanium, indium, and tin. M is preferably magnesium, copper, zinc, cobalt, nickel, iron, vanadium, titanium, or tin chloride (II), more preferably magnesium or copper, and still more preferably copper (Cu) from a viewpoint of reactivity with the colorant represented by formula (2). The metal-containing compound used in the present invention may have a neutral ligand depending on a central metal, and examples of a typical ligand include $H_2O$ and $NH_3$.

As the metal-containing compound, the following structure is exemplified.

| Compound No. | $R_4$ | $R_5$ | $R_6$ |
|---|---|---|---|
| | | [Chemical formula 12] | |
| 3-1 | $CH_3$—* | 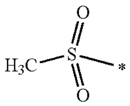 | 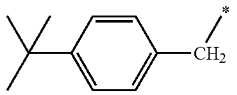 |
| 3-2 | $CH_3$—* | NC—* | 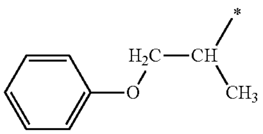 |
| 3-3 | $CH_3$—* | NC—* | 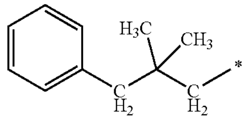 |
| 3-4 | $CH_3$—* | 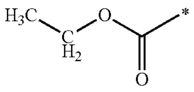 | 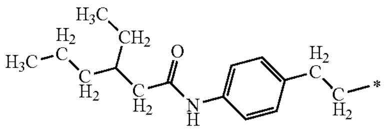 |
| 3-5 | $CH_3$—* | NC—* | 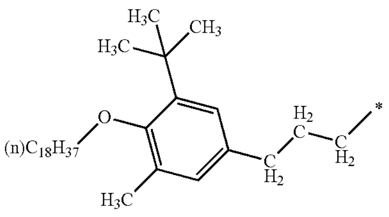 |
| 3-6 | $CH_3$—* | 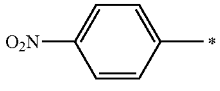 | 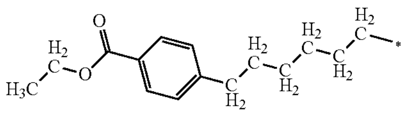 |

-continued
| Compound No. | $R_4$ | $R_5$ | $R_6$ |
|---|---|---|---|
| 3-7 | $CH_3$—* | NC—* | 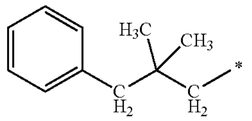 |
| 3-8 | $CH_3$—* | NC—* | 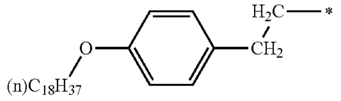 |
| 3-9 | $CH_3$—* | 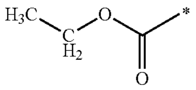 | 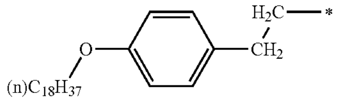 |
| 3-10 | $CH_3$—* | 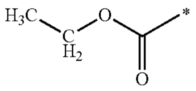 | 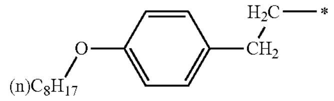 |
| 3-11 | $CH_3$—* | NC—* | 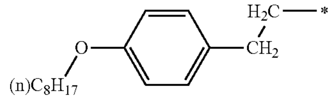 |
| 3-12 | $CH_3$—* | NC—* | 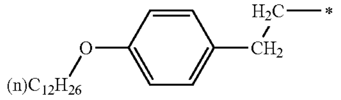 |
| 3-13 | $CH_3$—* | NC—* | 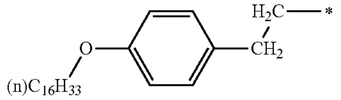 |
[Chemical formula 13]
| | | | |
|---|---|---|---|
| 3-14 | $CH_3$—* | 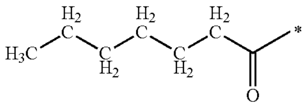 | 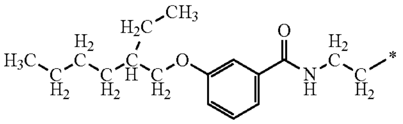 |
| 3-15 | $CH_3$—* | NC—* | 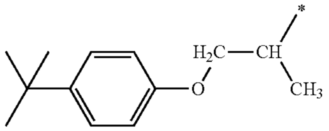 |
| 3-16 | $CH_3$—* | NC—* | 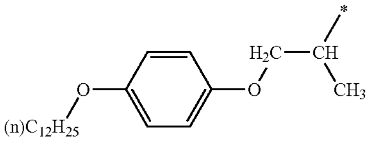 |
| 3-17 | $C_2H_5$—* | 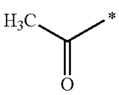 | 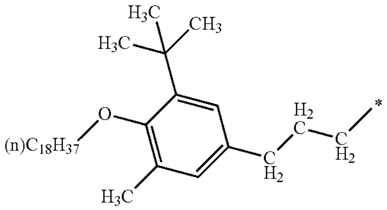 |

-continued
| Compound No. | $R_4$ | $R_5$ | $R_6$ |
|---|---|---|---|
| 3-18 | $C_2H_5$—* | NC—* | 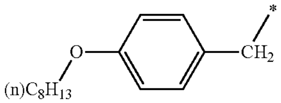 |
| 3-19 | $CH_3$—* | NC—* | 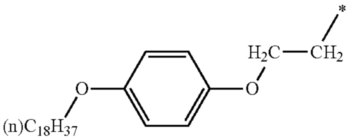 |
| 3-20 | $C_2H_5$—* | 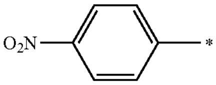 | 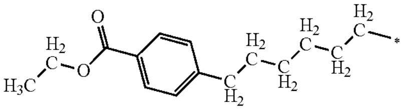 |
| 3-21 | $CH_3$—* | NC—* | 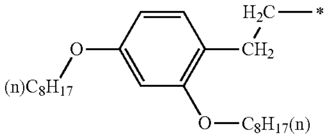 |
| 3-22 | $(CH_3)_2CH$—* | 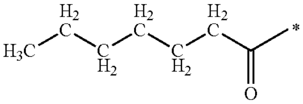 | 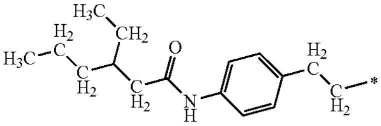 |
| 3-23 | $(CH_3)_2CH$—* | 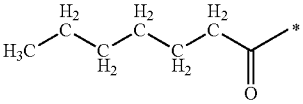 | 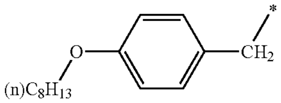 |
| 3-24 | $CH_3$—* | NC—* | 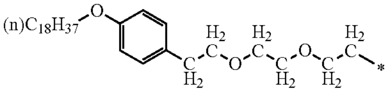 |
| 3-25 | $CH_2$—O—$C_2H_4$—* | 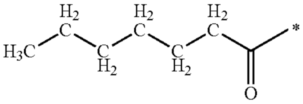 | 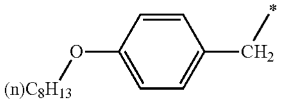 |
| 3-26 | 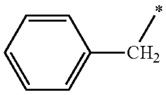 | NC—* | 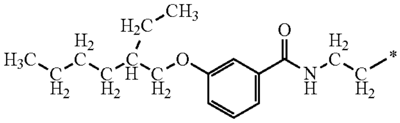 |
[Chemical formula 14]
| | | | |
|---|---|---|---|
| 3-27 | 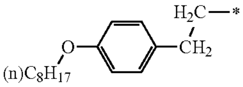 | NC—* | 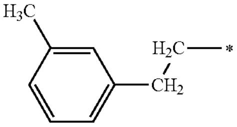 |
| 3-28 | $CH_3$—* | 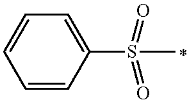 | 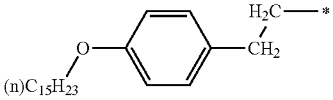 |

-continued
| Compound No. | $R_4$ | $R_5$ | $R_6$ |
|---|---|---|---|
| 3-29 | $CH_3$—* | 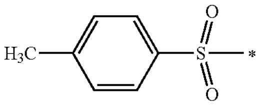 | 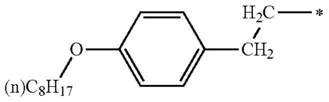 |
| 3-30 | $CH_3$—* | NC—* | 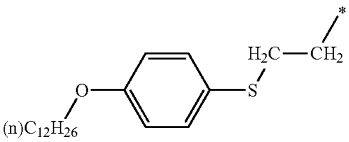 |
| 3-31 | $CH_3$—* | NC—* | 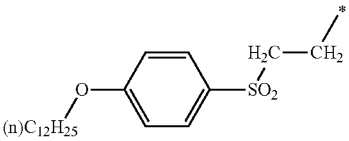 |
| 3-32 | $CH_3$—* | NC—* | 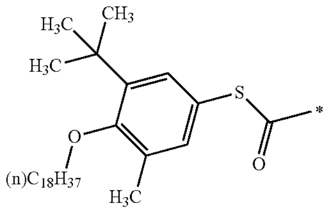 |
| 3-33 | $CH_3$—* | NC—* | 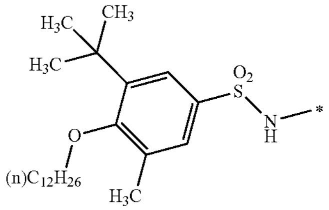 |
| 3-34 | $CH_3$—* | NC—* | 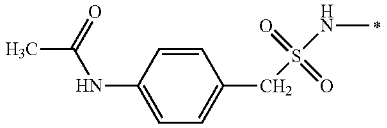 |
| 3-35 | $C_2H_5$—* | NC—* | 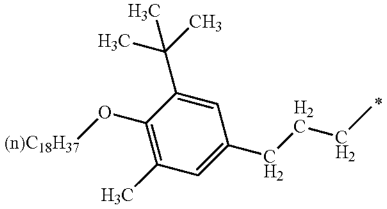 |
| 3-36 | $CH_3$—* | NC—* | 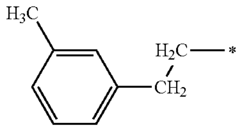 |
| 3-37 | $CH_3$—* | 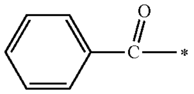 | 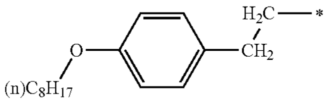 |

-continued
| Compound No. | $R_4$ | $R_5$ | $R_6$ |
|---|---|---|---|
| [Chemical formula 15] | | | |
| 3-38 | $(n)C_4H_9$—* | NC*— | 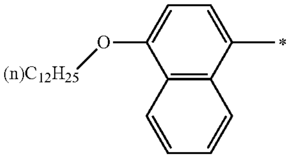 |
| 3-39 | 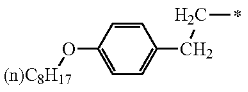 | NC—* | 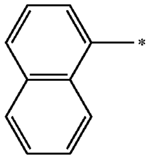 |
| 3-40 | $CH_3$—* | NC—* | 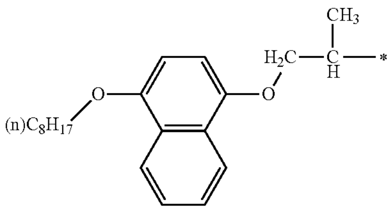 |
| 3-41 | $CH_3CH_2C(CH_3)_2$—* | H—* | 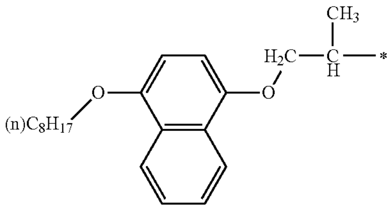 |
| 3-42 | $CH_3$—* | 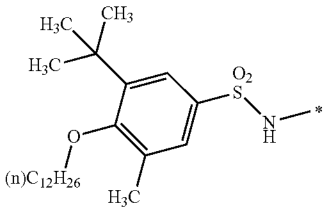 | 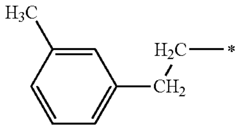 |
| 3-43 | 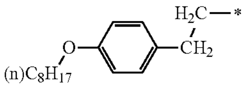 | Cl—* | 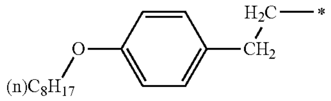 |
| 3-44 | $CH_3$—* | Br—* | 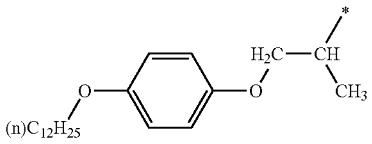 |
| 3-45 | $CH_3$—* | $CH_3$—O—C(=O)—* | 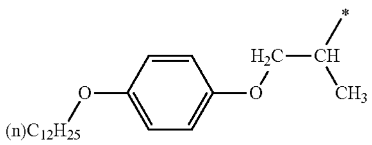 |

-continued

| Compound No. | $R_4$ | $R_5$ | $R_6$ |
|---|---|---|---|
| 3-46 | $CH_3$—* | $CH_3$—S(═O)—* | 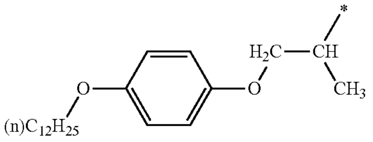 |
| 3-47 | $CH_3$—* | $C_6H_6$—O—C(═O)—* | 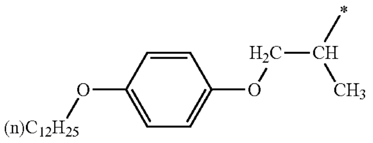 |

These metal-containing compounds may be used singly or in combination of two or more types thereof. The content of the metal-containing compound is preferably 1% by mass or more and 15% by mass or less, and more preferably 2% by mass or more and 10% by mass or less with respect to the entire color toner.

The metal-containing compound is preferably synthesized by causing a raw material compound represented by the following formula (3-1) to react with a divalent metal compound. Examples of the divalent metal compound used include metal chloride (II), metal acetate (II), and metal perchlorate. $R_4$, $R_5$, and $R_6$ in the following formula (3-1) are similar to $R_4$, $R_5$, and $R_6$ in formula (3), respectively.

[Chemical formula 16]

(3-1)

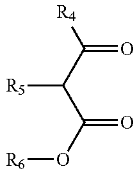

Conditions for a reaction between the colorant represented by general formula (2) and the metal-containing compound represented by general formula (3) are not particularly limited. A reaction compound can be obtained by mixing the colorant represented by general formula (2) and the metal-containing compound represented by general formula (3) in a solvent, and stirring the mixture, for example, preferably at 50° C. or higher and 95° C. or lower, more preferably at 60° C. or higher and 90° C. or lower, and still more preferably at 75° C. or higher and 87° C. or lower, preferably for five minutes or more and 250 minutes or less, more preferably for 10 minutes or more and 60 minutes or less, still more preferably for 15 minutes or more and 30 minutes or less. Specifically, for example, by adding a dispersion of the metal-containing compound (metal-containing compound fine particle dispersion) to a dispersion of the colorant (colorant fine particle dispersion) or a dispersion containing the colorant, such as a resin fine particle dispersion containing the colorant or a wax-containing resin fine particle dispersion, the dispersion becomes cloudy once, but the dispersion (supernatant) becomes transparent by stirring. As a result, it is considered that the reaction between the colorant represented by general formula (2) and the metal-containing compound represented by general formula (3) is completed and the reaction compound is formed. As the solvent used in the reaction, a solvent used for preparing the toner is preferably used.

The colorant represented by general formula (2) (hereinafter, also referred to as colorant (a)) and the metal-containing compound represented by general formula (3) (hereinafter, also referred to as metal-containing compound (b)) react with each other at a ratio of 1:1 (molar ratio) to form an ionic compound, but the molar ratio of colorant (a):metal-containing compound (b) is preferably 1:0.7 to 1.2.

The magenta colorant contained in the third toner may contain a magenta colorant in addition to the compound obtained by a reaction between the colorant represented by general formula (2) and the metal-containing compound represented by general formula (3). Examples of the magenta colorant can be similar to those described for the first toner, and therefore detailed description thereof will be omitted.

The colorant contained in the third toner may contain a colorant other than the magenta colorant. Examples of the colorant other than the magenta colorant include a black colorant, an orange or yellow colorant, a red colorant, and a cyan or green colorant. Examples of these colorants can be similar to those described for the first toner, and therefore detailed description thereof will be omitted.

The content and particle size of the colorant contained in the third toner can be similar to those described for the first toner, and therefore detailed description thereof will be omitted.

1-4. Toner Form

[Core-Shell Structure]

For each toner contained in the toner set, a toner particle can be used as it is as the toner. However, each toner may be a toner particle having a multi-layer structure such as a core-shell structure including the toner particle as a core particle and a shell layer covering a surface of the core particle. The shell layer does not have to coat the entire surface of the core particle, and the core particle may be partially exposed. A cross section of the core-shell structure can be confirmed by a known observation means such as a transmission electron microscope (TEM) or a scanning probe microscope (SPM).

In a case of the core-shell structure, the properties such as a glass transition point, a melting point, and hardness can be made different between the core particle and the shell layer, and it is possible to design a toner particle according to a purpose. For example, on a surface of a core particle containing a binder resin, a colorant, a release agent, and the like and having a relatively low glass transition point (Tg), a resin having a relatively high glass transition point (Tg) is aggregated and fusion-bonded, and a shell layer can be thereby formed. The shell layer preferably contains an amorphous polyester resin.

[Particle Size of Toner Particle]

An average particle size of the toner particles is preferably 3 μm or more and 10 μm or less, and more preferably 5 μm or more and 8 μm or less in terms of a volume-based median diameter ($d_{50}$). Within the above range, high reproducibility can be obtained even with a very small dot image at a 1200 dpi level. Note that the average particle size of the toner particles can be controlled by the concentration of a flocculant used for manufacturing, the amount of an organic solvent added, fusion-bonding time, the composition of the binder resin, and the like.

The volume-based median diameter ($d_{50}$) of the toner particles can be measured using a measuring device in which a computer system equipped with data processing software V 3.51 is connected to "Multisizer 3" (manufactured by Beckman Coulter, Inc.). Specifically, a measurement sample (toner) is added to a surfactant solution (for the purpose of dispersing the toner particles, for example, a surfactant solution obtained by diluting a neutral detergent containing a surfactant component 10 times with pure water) and familiarized. Thereafter, the resulting solution is subjected to ultrasonic dispersion to prepare a toner particle dispersion. This toner particle dispersion is injected into a beaker containing "ISOTON II" (manufactured by Beckman Coulter, Inc.) in a sample stand with a pipette until a display concentration of the measuring device reaches 8%. Here, by setting the concentration to this concentration, a reproducible measured value can be obtained. Then, in the measuring device, the count number of measurement particles is set to 25000, an aperture diameter is set to 100 μm, a measurement range of 2 to 60 μm is divided into 256 parts, and a frequency value is calculated. A particle size of 50% from a larger volume integration fraction is taken as the volume-based median diameter (d50).

The average circularity of the toner particles is preferably 0.930 or more and 1.000 or less, and more preferably 0.950 or more and 0.995 or less from a viewpoint of enhancing stability of charging characteristics and low-temperature fixability. If the average circularity is within the above range, each toner particle is less likely to be crushed. This makes it possible to suppress contamination of a frictional charge imparting member, to stabilize chargeability of the toner, and to enhance image quality of a formed image.

The average circularity of the toner particles can be measured using "FPIA-3000" (manufactured by Sysmex Corporation). Specifically, a measurement sample (toner) is familiarized with an aqueous solution containing a surfactant, and is subjected to an ultrasonic dispersion treatment for one minute to be dispersed.

Thereafter, the resulting solution is photographed using "FPIA-3000" (manufactured by Sysmex Corporation) under measurement conditions: HPF (high magnification imaging) mode at an appropriate concentration of 3,000 to 10,000 HPF detection numbers. If the HPF detection number is within the above range, a reproducible measurement value can be obtained. The circularity of each toner particle is calculated from the photographed particle image according to the following formula (I), and the circularities of the toner particles are summed up, and the resulting sum is divided by the total number of toner particles to obtain an average circularity.

Circularity=(peripheral length of circle having the same projected area as particle image)/(peripheral length of particle projected image) (I)

1-5. Method for Manufacturing Toner

A method for manufacturing the first toner and the second toner is not particularly limited, and examples thereof include a known method such as a kneading pulverization method, a suspension polymerization method, an emulsion aggregation method, a dissolution suspension method, a polyester elongation method, or a dispersion polymerization method. The emulsion aggregation method is preferably adopted from a viewpoint of uniformity of the particle size, controllability of the shape, and ease of forming the core-shell structure. In addition, the emulsion aggregation method is preferably used from a viewpoint that it is easy to control the crystalline polyester resin in the toner particles so as to be located at a desired position by utilizing hydrophobicity of the crystalline polyester resin and the release agent.

1-5-1. Emulsification Aggregation Method

The emulsion aggregation method is a method for manufacturing toner particles, the method including mixing a dispersion of crystalline resin particles, a dispersion of amorphous resin particles, and a dispersion of colorant particles, aggregating the particles until the particles each have a predetermined particle size, and then fusion-bonding the crystalline resin particles and the amorphous resin particles to each other to perform shape control. Specifically, toner particles are manufactured through the following steps (a) to (g).

(a) Preparation of Each Dispersion (a-1) Preparation of Crystalline Resin Particle Dispersion Examples of a method for preparing the crystalline resin particle dispersion include a method for dispersing the obtained crystalline resin in an aqueous medium without using a solvent and a method for dissolving the crystalline resin in a solvent such as ethyl acetate or methyl ethyl ketone to prepare a solution, emulsifying and dispersing the solution in an aqueous medium using a disperser, and removing the solvent therefrom.

In the present invention, the "aqueous medium" refers to a medium containing at least 50% by mass of water, and examples of a component other than water include an organic solvent that is dissolved in water, such as methanol, ethanol, isopropanol, acetone, dimethylformamide, methyl cellosolve, or tetrahydrofuran. Among these solvents, it is preferable to use an alcohol-based organic solvent such as methanol, ethanol, or isopropanol, which is an organic solvent that does not dissolve a resin. Preferably, only water is used as the aqueous medium.

When the crystalline resin contains a crystalline polyester resin and its structure contains a carboxy group, ammonia, sodium hydroxide, or the like may be added in order to ion-dissociate the carboxy group and stably emulsify the resulting ions in an aqueous phase to smoothly promote emulsification. Furthermore, a dispersion stabilizer may be dissolved in the aqueous medium, and a surfactant, resin particles, or the like may be added for the purpose of improving dispersion stability of oil droplets.

As the dispersion stabilizer, a known stabilizer can be used. For example, a stabilizer soluble in an acid or an alkali, such as tricalcium phosphate, is preferably used, or a stabilizer that can be decomposed by an enzyme is preferably used from an environmental point of view. As the surfactant, a known anionic surfactant, cationic surfactant, nonionic surfactant, and amphoteric surfactant can be used. Examples of the resin particles for improving dispersion stability include polymethylmethacrylate resin particles, polystyrene resin particles, and polystyrene-acrylonitrile resin particles.

The dispersion treatment described above can be performed by utilizing mechanical energy. A disperser is not particularly limited, and examples thereof include a homogenizer, a low-speed shear disperser, a high-speed shear disperser, a frictional disperser, a high-pressure jet type disperser, an ultrasonic disperser, a high-pressure impact type disperser ultimizer, and an emulsification disperser.

During dispersion, a solution is preferably heated. Heating conditions are not particularly limited, but are usually 60° C. or higher and 200° C. or lower.

The volume-based median diameter of the crystalline resin particles in the crystalline resin particle dispersion prepared in this way is preferably 60 nm or more and 1000 nm or less, and more preferably 80 nm or more and 500 nm or less. Note that the median diameter can be controlled, for example, by the magnitude of mechanical energy during emulsification and dispersion.

The content of the crystalline resin particles in the crystalline resin particle dispersion is preferably 10% by mass or more and 50% by mass or less, and more preferably 15% by mass or more and 40% by mass or less with respect to the entire dispersion. Within such a range, spread of a particle size distribution can be suppressed, and toner characteristics can be improved.

(a-2) Preparation of Amorphous Resin Particle Dispersion

For example, when emulsion polymerization is performed in an aqueous medium to obtain an amorphous resin, the liquid after the polymerization reaction can be used as it is as an amorphous resin particle dispersion.

It is also possible to use a method for pulverizing an isolated amorphous resin as necessary, and then dispersing the amorphous resin in an aqueous medium using an ultrasonic disperser or the like in the presence of a surfactant. Examples of the aqueous medium and the surfactant are similar to those in the above (a-1) Preparation of crystalline resin particle dispersion.

The volume-based median diameter of the amorphous resin particles in the amorphous resin particle dispersion is preferably 60 nm or more and 1000 nm or less, and more preferably 80 nm or more and 500 nm or less. Note that the median diameter can be controlled, for example, by the magnitude of mechanical energy during polymerization.

The content of the vinyl-based resin particles in the amorphous resin particle dispersion is preferably 10% by mass or more and 50% by mass or less, and more preferably 15% by mass or more and 40% by mass or less with respect to the entire dispersion. Within such a range, spread of a particle size distribution can be suppressed, and toner characteristics can be improved.

In the present invention, the amorphous resin particle dispersion may contain a release agent. The content of the release agent with respect to the amorphous resin particle dispersion is preferably 2% by mass or more and 20% by mass or less, and more preferably 5% by mass or more and 15% by mass or less.

(a-3) Preparation of Colorant Particle Dispersion

A colorant is dispersed in a form of fine particles in an aqueous medium to prepare a colorant particle dispersion.

Examples of the aqueous medium used are similar to those in the above (a-1) Preparation of crystalline resin particle dispersion. A surfactant, resin particles, or the like may be added to the aqueous medium for the purpose of improving dispersion stability.

The colorant can be dispersed by a disperser using mechanical energy, examples of the disperser are similar to those in the above (a-1) Preparation of crystalline resin particle dispersion.

The volume-based median diameter of the colorant particles in the colorant particle dispersion is preferably 10 nm or more and 300 nm or less.

The content of the colorant in the colorant particle dispersion with respect to the entire dispersion is preferably 5% by mass or more and 45% by mass or less, and more preferably 10% by mass or more and 30% by mass or less. Within such a range, there is an effect of ensuring color reproducibility.

(b) Aggregation and Fusion-Bonding

A dispersion of the crystalline resin particles, a dispersion of the amorphous resin particles, and a dispersion of the colorant particles are mixed in an aqueous medium, and these particles are dispersed in the aqueous medium. Thereafter, a flocculant is added to the resulting dispersion. The resulting mixture is heated at a temperature equal to or higher than the glass transition point of the amorphous resin particles to aggregate the particles and fuse-bond the particles to each other.

The flocculant used in the present invention is not particularly limited, but is preferably selected from metal salts such as an alkali metal salt and a group 2 metal salt. Examples of the metal salts include: a monovalent metal salt of sodium, potassium, or lithium; a divalent metal salt of calcium, magnesium, manganese, or copper; and a trivalent metal salt of iron or aluminum. Specific examples of the metal salt include sodium chloride, potassium chloride, lithium chloride, calcium chloride, magnesium chloride, zinc chloride, copper sulfate, magnesium sulfate, manganese sulfate, and aluminum sulfate. Among these metal salts, a divalent or trivalent metal salt is particularly preferably used because aggregation can be promoted with a smaller amount thereof. These flocculants can be used singly or in combination of two or more types thereof.

The amount of the flocculant used is not particularly limited, but is preferably 2% by mass or more and 30% by mass or less, and more preferably 5% by mass or more and 20% by mass or less with respect to the solid content of the binder resin constituting the toner particles from a viewpoint of toner particle size controllability.

In the aggregation step, the temperature is preferably raised rapidly by heating after the flocculant is added, and a temperature rising rate is preferably 0.05° C./min or more. An upper limit of the temperature rising rate is not particularly limited, but is preferably 15° C./min or less from a viewpoint of suppressing generation of coarse particles due to rapid progress of fusion-bonding. Furthermore, after the temperature of the aggregation dispersion reaches a desired temperature, it is important to maintain the temperature of the aggregation dispersion for a certain period of time, preferably until the volume-based median diameter reaches 4.5 to 7.0 μm, and to continue fusion-bonding (c) Aging An aging treatment is performed by heating and stirring the system in which the associated particles are dispersed, and adjusting a heating temperature, a stirring speed, heating time and the like until the associated particles have a desired circularity. The aging treatment is performed as necessary.

(d) Cooling

The dispersion of toner particles is cooled. As a condition of the cooling treatment, cooling is preferably performed at a cooling rate of 1 to 20° C./min. A specific method for the cooling treatment is not particularly limited, and examples thereof include a method for introducing a refrigerant from the outside of a reaction container for cooling and a method for directly putting cold water into a reaction system for cooling.

(e) Filtration and Cleaning

The toner particles are separated from the cooled dispersion of the toner particles by solid-liquid separation. Deposits such as the surfactant or the flocculant are removed from the toner cake (aggregate obtained by aggregating the wet toner particles in a form of a cake), and the residue is cleaned.

A method for the solid-liquid separation is not particularly limited, but examples thereof include a centrifugal separation method, a reduced pressure filtration method using Nutsche or the like, and a filtration method using a filter press or the like.

(f) Drying

The cleaned toner cake is dried. A drying method is not particularly limited, but examples thereof include a drying method using a spray dryer, a vacuum freeze dryer, or a reduced pressure dryer. A stationary shelf dryer, a mobile dryer, a fluidized layer dryer, a rotary dryer, a stirring dryer, or the like is preferably used from a viewpoint of manufacturing stability.

(g) Addition of External Additive

An external additive is added to the toner particles as necessary.

As a device for mixing the external additive, a mechanical mixing device such as a Henschel mixer, a coffee mill, or a sample mill can be used. 2 Image Forming Method The toner set according to an embodiment of the present invention can be used in a known electrophotographic image forming method. The first toner is preferably attached to a position farthest from a surface of a recording medium from a viewpoint of tacking suppression. Note that an image formed by the image forming method according to an embodiment of the present invention may be an image in which the amount of adhesion of the first toner is smaller than the amount of adhesion of a toner other than the first toner, and may be, for example, a secondary color image formed by using the second toner, the third toner, and a small amount of the first toner. An image formed by the image forming method according to an embodiment of the present invention is more preferably an image in which the amount of adhesion of the first toner is larger than that of the above secondary color image from a viewpoint of tacking suppression and wax adhesion suppression, and is for example, preferably a three color image formed by using the first toner, the second toner, and the third toner.

2-1. Image Forming Device

The present invention provides an image forming device that forms a superimposed image of color toners, the image forming device including: a charging unit that charges an image carrier; an exposure unit that exposes the image carrier charged by the charging unit to form an electrostatic latent image; a developing unit that supplies a developer containing color toners to the electrostatic latent image formed by the exposure unit and performs development; a primary transfer unit that transfers the developer image formed by the developing unit onto a transfer belt; and a fixing unit that comes into contact with the developer image transferred from the transfer belt onto the transfer unit, heats the developer image, and fixes the developer image to a recording medium, in which an electrostatic latent image-developing toner set for forming the superimposed image is the above-described toner set.

For description of a general image forming device itself other than the color toner set, which is a characteristic of the present invention, for example, JP 2016-184164 A and JP 2017-207639 A are referred to, and the disclosure contents thereof are cited as a whole by reference.

Example

Hereinafter, the present invention will be described in more detail with reference to Example, but these descriptions do not limit the scope of the present invention.

[Preparation of Amorphous Resin Particle Dispersion]

<Preparation of Vinyl-Based Resin Particle Dispersion [D-S1]>

(First Stage Polymerization)

In a 5 L reaction container equipped with a stirrer, a temperature sensor, a cooling tube, and a nitrogen introducing device, 8 parts by mass of sodium dodecylsulfate and 3000 parts by mass of deionized water were put. While the resulting mixture was stirred at a stirring speed of 230 rpm under a nitrogen stream, the internal temperature was raised to 80° C. After the temperature was raised, a solution obtained by dissolving 10 parts by mass of potassium persulfate in 200 parts by mass of deionized water was added thereto, the liquid temperature was set to 80° C. again, and a mixed solution of the following monomers was added dropwise thereto over one hour.

| | |
|---|---|
| Styrene | 480 parts by mass |
| n-Butyl acrylate | 250 parts by mass |
| Methacrylic acid | 68 parts by mass |

After the above mixed solution was added dropwise, the resulting mixture was heated and stirred at 80° C. for two hours to polymerize the monomers, thus preparing a particle dispersion (a).

(Second Stage Polymerization)

In a 5 L reaction container equipped with a stirrer, a temperature sensor, a cooling tube, and a nitrogen introducing device, 1100 parts by mass of deionized water and 55 parts by mass of the particle dispersion (a) in terms of solid content prepared by the first stage polymerization were put, and the resulting mixture was heated to 87° C. Thereafter, a mixed solution obtained by dissolving the following monomers, chain transfer agent, and release agent at 85° C. was mixed and dispersed for 10 minutes using a mechanical disperser "CLEARMIX" (manufactured by M Technique Co., Ltd.) having a circulation path to prepare a dispersion containing emulsified particles (oil droplets). This dispersion was added to the 5 L reaction container. A polymerization initiator solution obtained by dissolving 5 parts by mass of potassium persulfate in 103 parts by mass of deionized water was added to the dispersion, and the system was heated and stirred at 87° C. for one hour to perform polymerization, thus preparing a particle dispersion (b).

| | |
|---|---|
| Styrene | 257 parts by mass |
| 2-Ethylhexyl acrylate | 95 parts by mass |
| Methacrylic acid | 38 parts by mass |

-continued

| | |
|---|---|
| Chain transfer agent: n-octyl-3-mercaptopropionate | 4 parts by mass |
| Release agent 1: HNP0190 (manufactured by Nippon Seiro Co., Ltd.) | 131 parts by mass |

(Third Stage Polymerization)

To the particle dispersion (b) obtained by the second stage polymerization, a solution obtained by dissolving 7 parts by mass of potassium persulfate in 158 parts by mass of deionized water was further added. Furthermore, under a temperature condition of 84° C., a mixed solution of the following monomers and chain transfer agent was added dropwise thereto over 90 minutes.

| | |
|---|---|
| Styrene | 370 parts by mass |
| n-Butyl acrylate | 165 parts by mass |
| Methacrylic acid | 40 parts by mass |
| Methyl methacrylate | 47 parts by mass |
| n-Octyl-3-mercaptopropionate | 9 parts by mass |

After completion of the dropwise addition, the resulting mixture was heated and stirred for two hours to perform polymerization, and then cooled to 28° C. to obtain a vinyl-based resin fine particle dispersion [D-S1].

<Preparation of Vinyl-Based Resin Fine Particle Dispersions [D-S2] to [D-S5]>

Vinyl-based resin fine particle dispersions [D-S2] to [D-S5] were obtained in a similar manner to the above <Preparation of vinyl-based resin fine particle dispersion [D-S1]> except that the type of release agent in the second stage polymerization was changed to those described in Table 1. Note that a release agent 4 was purified by subjecting a release agent 2 to a centrifugal thin film distillation device (CEH-400BII manufactured by ULVAC, Inc.).

TABLE 1

| | Release agent No. | Product name or substance name | Type of release agent | Melting point [° C.] |
|---|---|---|---|---|
| D-S1 | 1 | HNP0190 (manufactured by Nippon Seiro Co., Ltd.) | Hydrocarbon wax | 85.2 |
| D-S2 | 2 | NCM9395 (manufactured by Sasol) | Hydrocarbon wax | 90.0 |
| D-S3 | 3 | HiMic-1080 (manufactured by Nippon Seiro Co., Ltd.) | Hydrocarbon wax | 78.0 |
| D-S4 | 4 | NCM9395 (manufactured by Sasol) (*) | Hydrocarbon wax | 92.1 |
| D-S5 | 5 | Ethylene glycol distearate | Ester wax | 81.1 |

(*) Release agent 4 was manufactured by purifying release agent 2.

<Preparation of Amorphous Polyester Resin Particle Dispersion [D-P1]>

A mixed solution of the following vinyl-based resin monomers, bireactive monomer, and polymerization initiator was nut in a dropping funnel.

| | |
|---|---|
| Styrene | 80 parts by mass |
| n-Butyl acrylate | 20 parts by mass |
| Acrylic acid | 10 parts by mass |
| di-t-Butyl peroxide (polymerization initiator) | 16 parts by mass |

The following amorphous polyester resin monomers were put in a four-necked flask equipped with a nitrogen introduction tube, a dehydration tube, a stirrer, and a thermocouple, and heated to 170° C. to be dissolved.

| | |
|---|---|
| 2 mol Adduct of bisphenol A ethylene oxide | 50 parts by mass |
| 2 mol Adduct of bisphenol A propylene oxide | 250 parts by mass |
| Terephthalic acid | 120 parts by mass |
| Dodecenyl succinic acid | 46 parts by mass |

Under stirring, the mixed solution contained in the dropping funnel was added dropwise to the four-necked flask over 90 minutes, and aged for 60 minutes. Thereafter, unreacted monomers were removed under reduced pressure (8 kPa). Thereafter, 0.4 parts by mass of $Ti(OBu)_4$ as an esterification catalyst was added thereto, and the temperature was raised to 235° C. A reaction was performed at normal pressure (101.3 kPa) for five hours and further performed under reduced pressure (8 kPa) for one hour. Subsequently, the resulting solution was cooled to 200° C., and a reaction was caused under reduced pressure (20 kPa). Thereafter, a solvent was removed to obtain an amorphous polyester resin [A1]. The amorphous polyester resin [A1] thus obtained had a weight average molecular weight (Mw) of 24000 and an acid value of 18.2 mgKOH/g.

108 parts by mass of the obtained amorphous polyester resin [A1] was stirred at 70° C. for 30 minutes in 64 parts by mass of methyl ethyl ketone and dissolved therein. Next, 3.4 parts by mass of a 25% by mass sodium hydroxide aqueous solution was added to this solution. This solution was put in a reaction container equipped with a stirrer, and 210 parts by mass of water warmed to 70° C. was added dropwise thereto and mixed over 70 minutes while being stirred. The liquid in the container became cloudy during the dropwise addition. After the entire amount of water was added dropwise, a uniformly emulsified state was obtained. As a result of measurement of the particle sizes of the oil droplets of this emulsion using "Nanotrack Wave" (manufactured by Microtrack Bell), the volume average particle size thereof was 90 nm.

Subsequently, while the temperature of the emulsion was maintained at 70° C., the emulsion was stirred under reduced pressure of 15 kPa (150 mbar) for three hours using a diaphragm type vacuum pump "V-700" (manufactured by BUCHI) to remove methyl ethyl ketone by distillation, thus preparing an amorphous polyester resin fine particle dispersion [D-A1] in which fine particles of the amorphous polyester resin were dispersed. As a result of measurement using the above particle size distribution measuring device, the volume average particle size of the amorphous polyester resin in the amorphous polyester resin particle dispersion was 94 mm The weight average molecular weight (Mw) of each resin in the present Example can be measured using one obtained by connecting a gel permeation chromatography (HLC-8320GPC: manufactured by Tosoh Corporation), one column of "TSK gel guardcolumn Super HZ-L" (manufactured by Tosoh Corporation), and three columns of "TSK gel Super HZM-M" (manufactured by Tosoh Corporation). Specifically, the columns are stabilized at ° C., and tetrahydrofuran (THF) as a carrier solvent is caused to flow through the columns at this temperature at a flow rate of 0.35 mL/min. A THF sample solution of a measurement sample (resin) adjusted to a sample concentration of 1 mg/mL is treated with a roll mill at room temperature for 10 minutes and treated with a membrane filter having a pore size of 0.2 μm to obtain a sample solution. 10 μL of this sample solution is injected into the device together with the above carrier solvent, and a refractive index is detected using a refractive index detector (RI detector). Subsequently, based on a calibration curve created using a polystyrene standard sample having a monodispersed molecular weight distribution, a molecular weight distribution of the measurement sample is calculated. The calibration curve is created from 10 samples of "polystylene standard sample TSK standard": "A-500", "F-1", "F-10", "F-80", "F-380", "A-2500", "F-4", "F-40", "F-128", and "F-700" manufactured by Tosoh Corporation. Note that a data collection interval in sample analysis is 300 ms.

The acid value of each resin in the present Example was determined by the following methods (1) to (3) in accordance with JIS K0070-1992.

(1) Preparation of Reagent 1.0 g of phenolphthalein was dissolved in 90 mL of ethyl alcohol (95% by volume), and deionized water was added thereto to adjust the volume thereof to 100 mL, thus preparing a phenolphthalein solution. Next, 7 g of JIS special grade potassium hydroxide was dissolved in 5 mL of deionized water, and ethyl alcohol (95% by volume) was added thereto to adjust the volume thereof to 1 liter. The resulting solution was put in an alkali-resistant container so as not to come into contact with carbon dioxide, left for three days, and then filtered to prepare a potassium hydroxide solution. Standardization was performed in accordance with the description in JIS K0070-1966.

(2) Main Test 2.0 g of the crushed sample was precisely weighed in a 200 mL Erlenmeyer flask, and 100 mL of a mixed solution of toluene:ethanol=2:1 was added thereto. The sample was dissolved therein over five hours. Subsequently, several drops of the phenolphthalein solution prepared as an indicator were added thereto, and titration was performed with the prepared potassium hydroxide solution. Note that an end point of the titration was determined as a time point when light red color of the indicator continued for about 30 seconds.

(3) Blank Test

A similar operation to that in the main test is performed except that no sample is used (that is, only a mixed solution of toluene:ethanol=2:1 is used).

An acid value was calculated by substituting the titration results of the main test and the blank test in the following formula (1).

$$A=[(B-C)\times f\times 5.6]/S \qquad \text{formula (1)}$$

A: Acid value (mgKOH/g)

B: Amount of potassium hydroxide solution added during main test (mL)

C: Amount of potassium hydroxide solution added during blank test (mL)

f: Factor of 0.1 mol/L potassium hydroxide ethanol solution

S: Mass of sample (g)

25 mL of 0.1 mol/L hydrochloric acid was put in an Erlenmeyer flask, several drops of the phenolphthaline solution were added thereto, and titration was performed with the potassium hydroxide solution. The factor of the potassium hydroxide ethanol solution was determined from the amount the potassium hydroxide solution required for neutralization. Note that the hydrochloric acid used was prepared in accordance with JIS K8001-1998.

[Preparation of Crystalline Resin Fine Particle Dispersion]

<Synthesis of Crystalline Resin [C1]>

The following raw material monomers of an addition polymerization-based resin (styrene acrylic resin: StAc) unit containing a bireactive monomer and the following polymerization initiator were put in a dropping funnel.

| | |
|---|---|
| Styrene | 40 parts by mass |
| n-Butyl acrylate | 16 parts by mass |
| Acrylic acid | 3.5 parts by mass |
| Polymerization initiator (di-t-butyl peroxide) | 8 parts by mass |

In addition, the following raw material monomers of a polycondensation-based resin (crystalline polyester resin: CPEs) unit were put in a four-necked flask equipped with a nitrogen introduction tube, a dehydration tube, a stirrer, and a thermocouple, and heated to 170° C. to be dissolved therein.

| | |
|---|---|
| Tetradecanedioic acid | 280 parts by mass |
| 1,4-Butanediol | 105 parts by mass |

Subsequently, the above monomers were put in a reaction container equipped with a stirrer, a thermometer, a cooling tube, and a nitrogen gas introduction tube, and the inside of the reaction container was replaced with a dry nitrogen gas.

To the obtained mixed solution, 0.4 parts by mass of $Ti(O\text{-}n\text{-}Bu)_4$ was added, and the temperature was raised to 235° C. A reaction was caused at normal pressure (101.3 kPa) for five hours and further caused under reduced pressure (8 kPa) for one hour. Subsequently, the obtained reaction solution was cooled to 200° C., and then a reaction was caused under reduced pressure (20 kPa) such that an acid value calculated by the above measurement method was 20.0 mgKOH/g after introduction of the crystal nucleating agent. Subsequently, the pressure in the reaction container was gradually released to return to normal pressure. Thereafter, 20.4 parts by mass of stearic acid was added thereto as a crystal nucleating agent, and a reaction was caused under normal pressure at a temperature of 200° C. for 1.5 hours. Thereafter, the pressure in the reaction container was reduced to 5 kPa or less at 200° C., and a reaction was caused for 2.5 hours to obtain a crystalline resin [C1]. The obtained crystalline resin had a weight average molecular weight (Mw) of 11500 and an acid value of 20.0 mgKOH/g.

<Preparation of Crystalline Resin Fine Particle Dispersion [D-C1]>

174 parts by mass of the crystalline resin obtained by the above method was put in 102 parts by mass of methyl ethyl ketone, stirred at 75° C. for 30 minutes, and dissolved therein. Next, 3.1 parts by mass of a 25% by mass sodium hydroxide aqueous solution was added to this solution. This solution was put in a reaction container equipped with a stirrer, and 375 parts by mass of water warmed to 70° C. was added dropwise thereto and mixed over 70 minutes while being stirred. The liquid in the container became cloudy during the dropwise addition. After the entire amount of water was added dropwise, a uniformly emulsified state was obtained.

Subsequently, while the emulsion was maintained at 70° C., the emulsion was stirred under reduced pressure of 15 kPa (150 mbar) for three hours using a diaphragm type vacuum pump "V-700" (manufactured by BUCHI) to remove methyl ethyl ketone by distillation. Thereafter, the residue was cooled at a cooling rate of 6° C./min to prepare a crystalline resin fine particle dispersion [D-C1] in which fine particles of the crystalline resin were dispersed. As a result of measurement using the above particle size distribution measuring device, the volume average particle size of the crystalline resin fine particles in the crystalline resin fine particle dispersion [D-C1] was 202 nm.

<Synthesis of Crystalline Resin [C2]>

As compared with the above <Synthesis of Crystalline Resin [C1]>, the amount of 1,4-butanediol used was changed to 92 parts by mass, the crystal nucleating agent was changed to 19.8 parts by mass of stearyl alcohol, and the reaction time was appropriately changed such that the acid value of the crystalline resin after the crystal nucleating agent was introduced to cause 100% reaction was the value illustrated in Table 2. A crystalline resin [C2] was synthesized in a similar manner to <Synthesis of Crystalline Resin [C1]> except for the above changes.

<Synthesis of Crystalline Resin [C4]>

As compared with the above <Synthesis of Crystalline Resin [C1]>, the amount of 1,4-butanediol used was changed to 130 parts by mass, the amount of stearic acid used was changed to 21.7 parts by mass, and the reaction time was appropriately changed such that the acid value of the crystalline resin after the crystal nucleating agent was introduced to cause 100% reaction was the value illustrated in Table 2. A crystalline resin [C4] was synthesized in a similar manner to <Synthesis of Crystalline Resin [C1]> except for the above changes.

<Synthesis of Crystalline Resin [C7]>

The following monomers were put in a reaction container equipped with a stirrer, a thermometer, a capacitor, and a nitrogen gas introduction tube, and the inside of the reaction container was replaced with a dry nitrogen gas.

| | |
|---|---|
| Tetradecanedioic acid | 280 parts by mass |
| 1,4-Butanediol | 105 parts by mass |

To the obtained mixed solution, 0.4 parts by mass of $Ti(O\text{-}n\text{-}Bu)_4$ was added, and the temperature was raised to 235° C. A reaction was caused at normal pressure (101.3 kPa) for five hours and further caused under reduced pressure (8 kPa) for one hour. Subsequently, the obtained reaction solution was cooled to 200° C., and then a reaction was caused under reduced pressure (20 kPa) such that an acid value calculated by the above measurement method was 21.4 mgKOH/g after introduction of the crystal nucleating agent. Subsequently, the pressure in the reaction container was gradually released to return to normal pressure. Thereafter, 17.4 parts by mass of stearic acid was added thereto as a crystal nucleating agent, and a reaction was caused under normal pressure at a temperature of 200° C. for 1.5 hours. Thereafter, the pressure in the reaction container was reduced to 5 kPa or less at 200° C., and a reaction was caused for 2.5 hours to obtain a crystalline resin [C7]. The crystalline resin [C7] had a weight average molecular weight (Mw) of 10800 and an acid value of 21.4 mgKOH/g.

<Synthesis of Crystalline Resin [C10]>

In a reactor equipped with a stirrer and a thermometer, 1000 parts by mass of isophorone diisocyanate, 830 parts by mass of 1,4-adipate (polyester diol formed by 1,4-butanediol and adipic acid), 96.3 parts by mass of stearic acid as a crystal nucleating agent, and 250 parts by mass of methyl ethyl ketone were put while nitrogen was introduced thereinto. Thereafter, a urethanization reaction was caused at 80° C. for six hours. Next, 2128 parts by mass of deionized water was added thereto while being stirred, and then the pressure inside the reaction system was reduced to remove the solvent, thus obtaining a crystalline resin fine particle dispersion [C10]. The crystalline resin [C10] had a weight average molecular weight (Mw) of 14100.

<Synthesis of Crystalline Resin [C15]>

The following raw material monomers of an addition polymerization-based resin (styrene acrylic resin: StAc) unit containing a bireactive monomer and the following polymerization initiator were put in a dropping funnel.

| | |
|---|---|
| Styrene | 40 parts by mass |
| n-Butyl acrylate | 16 parts by mass |
| Acrylic acid | 4 parts by mass |
| Polymerization initiator (di-t-butyl peroxide) | 8 parts by mass |

In addition, the following raw material monomers of a polycondensation-based resin (crystalline polyester resin: CPEs) unit were put in a four-necked flask equipped with a nitrogen introduction tube, a dehydration tube, a stirrer, and a thermocouple, and heated to 170° C. to be dissolved therein.

| | |
|---|---|
| Tetradecanedioic acid | 280 parts by mass |
| 1,4-Butanediol | 105 parts by mass |

Subsequently, the above monomers were put in a reaction container equipped with a stirrer, a thermometer, a cooling tube, and a nitrogen gas introduction tube, and the inside of the reaction container was replaced with a dry nitrogen gas.

To the obtained mixed solution, 0.4 parts by mass of $Ti(O\text{-}n\text{-}Bu)_4$ was added, and the temperature was raised to 235° C. A reaction was caused at normal pressure (101.3 kPa) for five hours and further caused under reduced pressure (8 kPa) for one hour. Subsequently, the obtained reaction solution was cooled to 200° C., and then a reaction was caused under reduced pressure (20 kPa) such that an acid value calculated by the above measurement method was 20.3 mgKOH/g to obtain a crystalline resin [C15].

<Synthesis of Other Crystalline Resins>

As compared with the above <Synthesis of Crystalline Resin [C1]>, the type of crystal nucleating agent and the amount of a crystal nucleating agent moiety with respect to the amount of the crystalline resin excluding the crystal nucleating agent were changed as illustrated in Table 2, and the reaction time was appropriately changed such that the acid value of the crystalline resin after the crystal nucleating agent was introduced to cause 100% reaction was the value illustrated in Table 2. Crystalline resins [C3], [C5], [C6], [C8], [C9], and [C11] to [C14] were prepared in a similar manner to <Synthesis of Crystalline Resin [C1]> except for the above changes.

TABLE 2

| Type | Crystal structure moiety | Type of crystal nucleating agent moiety | Amount of crystal nucleating agent moiety [% by mass] | HB | Mw | Acid value |
|---|---|---|---|---|---|---|
| C1 | Crystalline PES | Stearic acid | 5 | Present | 11500 | 20.0 |
| C2 | Crystalline PES | Stearyl alcohol | 5 | Present | 12100 | 20.1 |
| C3 | Crystalline PES | Stearic acid | 5 | Present | 15700 | 15.9 |
| C4 | Crystalline PES | Stearic acid | 5 | Present | 830 | 27.1 |
| C5 | Crystalline PES | Stearic acid | 5 | Present | 22000 | 13.1 |
| C6 | Crystalline PES | Stearic acid | 5 | Present | 29200 | 11.2 |
| C7 | Crystalline PES | Stearic acid | 5 | Absent | 10800 | 21.4 |
| C8 | Crystalline PES | Stearic acid | 2 | Present | 13800 | 19.9 |
| C9 | Crystalline PES | Stearic acid | 10 | Present | 9600 | 20.5 |
| C10 | Crystalline polyurethane | Stearic acid | 5 | Present | 14100 | 21.4 |
| C11 | Crystalline PES | Octanoic acid | 5 | Present | 12000 | 20.1 |
| C12 | Crystalline PES | Dotriacontanoic acid | 5 | Present | 11300 | 19.7 |
| C13 | Crystalline PES | Stearic acid | 16 | Present | 6200 | 20.4 |
| C14 | Crystalline PES | Stearic acid | 0.5 | Present | 16500 | 20.1 |
| C15 | Crystalline PES | — | 0 | Present | 17500 | 20.3 |

*Crystalline PES indicates crystalline polyester.
*HB indicates hybrid crystalline polyester resin.

<Preparation of Crystalline Resin Fine Particle Dispersions [D-C2] to [D-C15]>

Crystalline resin fine particle dispersions [D-C2] to [D-C15] were obtained in a similar manner to the above <Preparation of crystalline resin fine particle dispersion [D-C1]> except that the crystalline resin [C1] was changed to the crystalline resins [C2] to [C15], respectively.

[Preparation of Yellow Colorant Fine Particle Dispersion [PY]]

While a solution obtained by adding 90 parts by mass of sodium dodecyl sulfate to 1600 parts by mass of deionized water was stirred, 420 parts by mass of C.I. Pigment Yellow 74 was gradually added thereto. The resulting solution was dispersed using a stirrer CLEARMIX (manufactured by M Technique Co., Ltd.) to prepare a magenta colorant fine particle dispersion [PY]. The colorant particles in the dispersion had a volume-based median diameter of 200 nm.

[Preparation of Cyan Colorant Fine Particle Dispersion]

<Preparation of Cyan Colorant Fine Particle Dispersion [PC1]>

While a solution obtained by adding 226 parts by mass of sodium dodecyl sulfate to 1600 parts by mass of deionized water was stirred, 420 parts by mass of silicon phthalocyanine (compound represented by general formula (1-A)) was gradually added thereto. The resulting solution was dispersed using a stirrer CLEARMIX (manufactured by M Technique Co., Ltd.) to prepare a cyan colorant fine particle dispersion [PC1]. The colorant particles in the dispersion had a volume-based median diameter of 160 nm.

[Chemical formula 17]

(1-A)

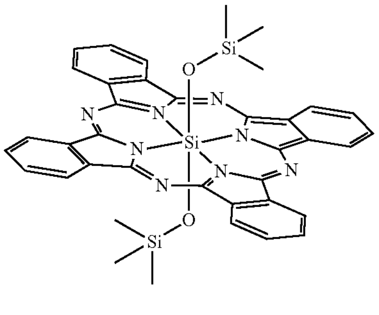

<Preparation of Cyan Colorant Fine Particle Dispersion [PC2]>

A cyan colorant fine particle dispersion [PC2] was prepared in a similar manner to the above <Preparation of cyan colorant fine particle dispersion [PC1]> except that the colorant added was changed from silicon phthalocyanine to copper phthalocyanine (C.I. Pigment Blue 15:3). The colorant particles in the dispersion had a volume-based median diameter of 110 nm.

[Preparation of Magenta Colorant Fine Particle Dispersion]

<Preparation of Magenta Colorant Fine Particle Dispersion [PM1]>

A magenta colorant fine particle dispersion [PM1] was prepared in a similar manner to the [Preparation of yellow colorant fine particle dispersion [PY]] except that the colorant added was changed from C.I. Pigment Yellow 74 to C.I. Pigment Red 269. The colorant particles in the dispersion had a volume-based median diameter of 250 nm.

<Preparation of Magenta Colorant Fine Particle Dispersion [PM2]>

A magenta colorant fine particle dispersion [PM2] was prepared in a similar manner to the above [Preparation of yellow colorant fine particle dispersion [PY]] except that the colorant added was changed from C.I. Pigment Yellow 74 to C.I. Pigment Red 122. The colorant particles in the dispersion had a volume-based median diameter of 240 nm.

<Preparation of Magenta Colorant Fine Particle Dispersion [PM3]>

A magenta colorant fine particle dispersion [PM3] was prepared in a similar manner to the above [Preparation of yellow colorant fine particle dispersion [PY]] except that the colorant added was changed from C.I. Pigment Yellow 74 to a compound obtained by a reaction between the colorant (a) represented by general formula (2) and the metal-containing compound (b) represented by general formula (3) at a molar ratio of 1:1. The colorant particles in the dispersion had a volume-based median diameter of 240 nm. Note that a method for synthesizing the colorant represented by general formula (2) and a method for synthesizing the metal-containing compound (b) represented by general formula (3) are described below.

(Synthesis of Colorant (a))

Hereinafter, the colorant (a) was synthesized according to the reaction formula represented by general formula (5). To 1.93 parts by mass of an intermediate 1, 1.53 parts by mass of an intermediate 2 was added, and 50 ml of toluene and 0.53 parts by mass of morpholine were further added thereto while being stirred. The resulting mixture was heated under reflux, and caused a reaction for eight hours while being dehydrated with an ester tube. After completion of the reaction, the reaction solution was concentrated, purified by column chromatography, and recrystallized from a mixed solvent of ethyl acetate/hexane to obtain 2.71 parts by mass of DX-1. DX-1 was identified by MASS, 1H-NMR, and IR spectrum, and was confirmed to be the target product. The purity of the obtained colorant (a) was 98% as a result of analysis by 1H-NMR. A visible absorption spectrum of the colorant (a) was measured (solvent: ethyl acetate). As a result, a maximum absorption wavelength was 535 nm, and a molar absorption coefficient was 71000 (L/mol·cm).

[Chemical formula 18]

(5)

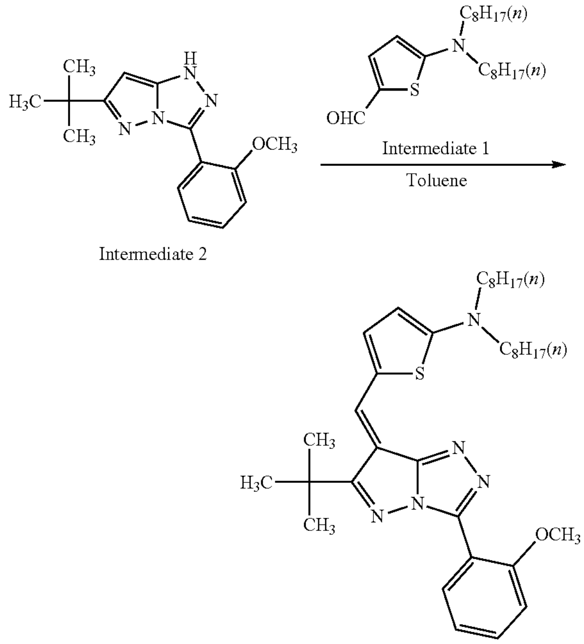

Colorant (a)

(Synthesis of Metal-Containing Compound (b) (Metal: Cu))

Hereinafter, the metal-containing compound (b) was synthesized according to the reaction formula represented by general formula (6).

[Chemical formula 19]

(6)

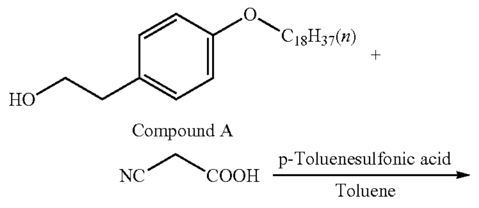

-continued

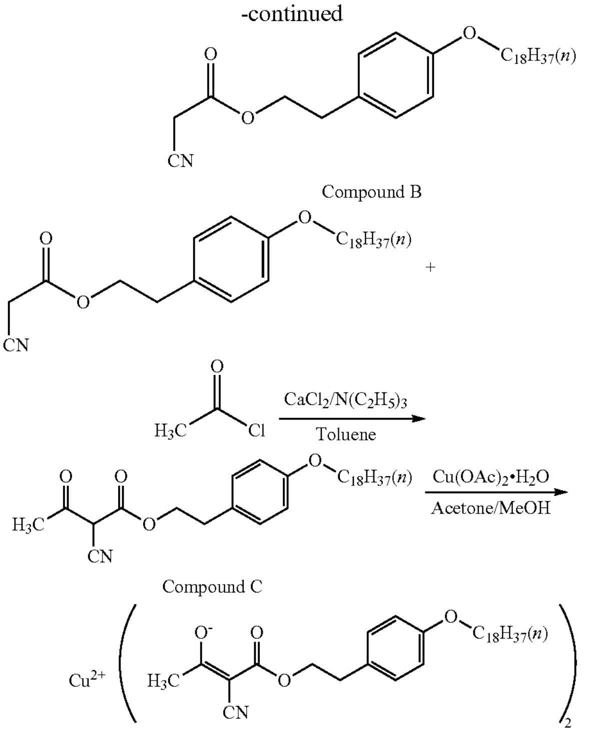

Metal-containing compound (b) (metal: Cu)

—Synthesis of Compound B—

To a 500 ml three-necked flask, 90.0 parts by mass of compound A, 21.5 parts by mass of cyanoacetic acid, 1.31 parts by mass of p-toluenesulfonic acid monohydrate, and 300 ml of toluene were added. The resulting mixture was heated under reflux using an ester tube for two hours while being dehydrated. The solvent was distilled off under reduced pressure, and then 500 ml of acetone was added thereto to perform recrystallization, thus obtaining 94.4 parts by mass of compound B.

—Synthesis of Compound C—

To a 100 ml three-necked flask, 5 parts by mass of compound B, 25 ml of toluene, 3.30 parts by mass of triethylamine, and 2.42 parts by mass of calcium chloride were added, and the resulting mixture was heated to 80° C. and stirred. After the internal temperature reached 80° C., 2.10 parts by mass of acetyl chloride was added dropwise thereto over one hour. After completion of the dropwise addition, the resulting mixture was cooled, and liquid separation was performed with dilute hydrochloric acid. Thereafter, the pH was neutralized with pure water, and the solvent was distilled off. 50 ml of toluene and 50 ml of ethyl acetate were added thereto to perform recrystallization, thus obtaining 4.30 parts by mass of compound C.

—Synthesis of Metal-Containing Compound (b)—

To a 200 nil three-necked flask, 2.00 parts by mass of compound C and 80 ml of acetone were added, and the resulting mixture was heated and stirred until the internal temperature reached 55° C. Thereafter, a solution obtained by dissolving 0.55 g of copper acetate monohydrate in 5 ml of a solvent of MeOH/water=5/1 was added dropwise thereto over 30 minutes. After completion of the dropwise addition, the precipitated solid was filtered to obtain 1.40 parts by mass of the metal-containing compound (b) (metal: Cu). The obtained metal compound (metal: Cu) had a transmittance of 98% (solvent: THF) at 500 nm and a purity of 98%.

[Manufacturing of Toner]

<Manufacturing of Yellow Toner [Ye1]>

Into a reaction container equipped with a stirrer, a temperature sensor, and a cooling tube, 480 parts by mass (in terms of solid content) of vinyl-based resin fine particle dispersion [D-S1] and 350 parts by mass of deionized water were put. The pH was adjusted to 10 by adding a 5 mol/liter sodium hydroxide aqueous solution at room temperature (25° C.). Furthermore, 36.4 parts by mass (in terms of solid content) of the yellow colorant fine particle dispersion [PY] was added thereto, and 80 parts by mass of a 50% by mass magnesium chloride aqueous solution was added thereto over 10 minutes at 30° C. while being stirred.

The obtained dispersion was allowed to stand for five minutes. Thereafter, the temperature thereof was raised to 80° C. over 60 minutes, and after reaching 80° C., 60 parts by mass (in terms of solid content) of the crystalline polyester resin fine particle dispersion [D-C1] was added thereto over 20 minutes. A stirring speed was adjusted such that a growth rate of the particle size was 0.01 μm/min, and the particles were grown until a volume-based median diameter measured by Coulter Multisizer 3 (manufactured by Coulter Beckman) reached 6.0 μm.

Subsequently, 60 parts by mass (in terms of solid content) of the amorphous polyester resin dispersion [D-A1] was added thereto over 30 minutes. When the supernatant of the reaction liquid became transparent, an aqueous solution obtained by dissolving 80 parts by mass of sodium chloride in 300 parts by mass of deionized water was added thereto to stop the growth of the particle size. Subsequently, the solution was stirred at 80° C., and fusion-bonding of the particles was caused to proceed until the average circularity of the toner particles reached 0.970. Thereafter, the solution was cooled at a temperature falling rate of 0.5° C./min or more to lower the liquid temperature to 30° C. or lower.

Subsequently, an operation of performing solid-liquid separation, redispersing the dehydrated toner cake in deionized water, and performing solid-liquid separation was repeated three times for cleaning After cleaning, the resulting product was dried at 35° C. for 24 hours to obtain toner matrix particles.

To 100 parts by mass of the obtained toner matrix particles, 0.6 parts by mass of hydrophobic silica particles (number average primary particle size: 12 nm, hydrophobicity: 68), 1.0 part by mass of hydrophobic titanium oxide particles (number average primary particle size: 20 nm, hydrophobicity: 63), and 1.0 part by mass of solgel silica (number average primary particle size=110 nm) were added and mixed at 32° C. for 20 minutes at a rotating blade peripheral speed of 35 mm/sec using a Henschel mixer (manufactured by Nippon Coke & Engineering Co., Ltd.).

After mixing, coarse particles were removed using a 45 μm opening sieve to obtain a yellow toner [Ye1]. The obtained yellow toner [Ye1] was mixed with a ferrite carrier having a volume average particle size of 32 μm coated with an acrylic resin so as to have a toner particle concentration of 6% by mass to be used as a two-component developer.

<Manufacturing of yellow toners [Ye2] to [Ye24]>

Yellow toners [Ye2] to [Ye24] were obtained in a similar manner to the above <Manufacturing of yellow toner [Ye1]> except that the amounts of the vinyl-based resin fine particle dispersion, the amorphous polyester resin fine particle dispersion, and the crystalline resin fine particle dispersion (each in terms of solid content) added and the type of crystalline resin were changed as illustrated in Table 3. Note that the % by mass of each of the vinyl-based resin, the amorphous polyester resin, and the crystalline resin illustrated in Table 3 represents the % by mass with respect to 600 parts by mass of the binder resin. Each of the obtained yellow toners [Ye2] to [Ye24] was mixed with a ferrite carrier having a volume average particle size of 32 μm coated with an acrylic resin so as to have a toner particle concentration of 6% by mass to be used as a two-component developer.

TABLE 3

| | | Crystalline resin | | | | | | Composition ration of binder resin [% by mass] | | |
|---|---|---|---|---|---|---|---|---|---|---|
| Yellow toner | Vinyl resin | Type | Crystal structure moiety | Nucleating agent moiety | Nucleating agent moiety [% by mass] | HB | Mw | Vinyl-based resin | Amorphous PES | Crystalline resin |
| Ye1 | S1 | C1 | Crystalline PES | Stearic acid | 5 | Present | 11500 | 80 | 10 | 10 |
| Ye2 | S1 | C2 | Crystalline PES | Stearyl alcohol | 5 | Present | 12100 | 80 | 10 | 10 |
| Ye3 | S2 | C1 | Crystalline PES | Stearic acid | 5 | Present | 11500 | 80 | 10 | 10 |
| Ye4 | S3 | C1 | Crystalline PES | Stearic acid | 5 | Present | 11500 | 80 | 10 | 10 |
| Ye5 | S4 | C1 | Crystalline PES | Stearic acid | 5 | Present | 11500 | 80 | 10 | 10 |
| Ye6 | S1 | C3 | Crystalline PES | Stearic acid | 5 | Present | 15700 | 80 | 10 | 10 |
| Ye7 | S1 | C4 | Crystalline PES | Stearic acid | 5 | Present | 830 | 80 | 10 | 10 |
| Ye8 | S1 | C5 | Crystalline PES | Stearic acid | 5 | Present | 22000 | 80 | 10 | 10 |
| Ye9 | S1 | C6 | Crystalline PES | Stearic acid | 5 | Present | 29200 | 80 | 10 | 10 |
| Ye10 | S1 | C7 | Crystalline PES | Stearic acid | 5 | Absent | 10800 | 80 | 10 | 10 |
| Ye11 | S1 | C8 | Crystalline PES | Stearic acid | 2 | Present | 13800 | 80 | 10 | 10 |
| Ye12 | S1 | C9 | Crystalline PES | Stearic acid | 10 | Present | 9600 | 80 | 10 | 10 |
| Ye13 | S1 | C1 | Crystalline PES | Stearic acid | 5 | Present | 11500 | 80 | 17 | 3 |
| Ye14 | S1 | C1 | Crystalline PES | Stearic acid | 5 | Present | 11500 | 80 | 4 | 16 |
| Ye15 | S1 | C10 | Crystalline polyurethane | Stearic acid | 5 | Present | 14100 | 80 | 10 | 10 |
| Ye16 | S1 | C1 | Crystalline PES | Stearic acid | 5 | Present | 11500 | 58 | 32 | 10 |
| Ye17 | S1 | C11 | Crystalline PES | Octanoic acid | 5 | Present | 12000 | 80 | 10 | 10 |
| Ye18 | S1 | C12 | Crystalline PES | Dotriacontanoic acid | 5 | Present | 11300 | 80 | 10 | 10 |
| Ye19 | S1 | C13 | Crystalline PES | Stearic acid | 16 | Present | 6200 | 80 | 10 | 10 |
| Ye20 | S1 | C14 | Crystalline PES | Stearic acid | 0.5 | Present | 16500 | 80 | 10 | 10 |

TABLE 3-continued

| Yellow toner | Vinyl resin | Crystalline resin: Type | Crystal structure moiety | Nucleating agent moiety | Nucleating agent moiety [% by mass] | HB | Mw | Composition ration of binder resin [% by mass]: Vinyl-based resin | Amorphous PES | Crystalline resin |
|---|---|---|---|---|---|---|---|---|---|---|
| Ye21 | S5 | C1 | Crystalline PES | Stearic acid | 5 | Present | 11500 | 80 | 10 | 10 |
| Ye22 | S1 | — | — | — | — | — | — | 80 | 20 | 0 |
| Ye23 | S1 | C1 | Crystalline PES | Stearic acid | 5 | Present | 11500 | 48 | 42 | 10 |
| Ye24 | S1 | C15 | Crystalline PES | — | 0 | Present | 17500 | 80 | 10 | 10 |

*S1 to S5 use D-S1 to D-S5, respectively.
*Crystalline PES and Amorphous PES indicate crystalline polyester and amorphous polyester, respectively.
*HB indicates hybrid crystalline polyester resin.

<Manufacturing of Cyan Toners [Cy1] to [Cy9]>

Cyan toners [Cy1] to [Cy9] were obtained in a similar manner to the above <Manufacturing of yellow toner [Ye1]> except that the amounts of the vinyl-based resin fine particle dispersion, the amorphous polyester resin fine particle dispersion, and the crystalline resin fine particle dispersion (each in terms of solid content) added, the type of crystalline resin, and the type of colorant fine particle dispersion were changed as illustrated in Table 4. Note that the % by mass of each of the vinyl-based resin, the amorphous polyester resin, and the crystalline resin illustrated in Table 4 represents the % by mass with respect to 600 parts by mass of the binder resin. Each of the obtained cyan toners [Cy1] to [Cy9] was mixed with a ferrite carrier having a volume average particle size of 32 μm coated with an acrylic resin so as to have a toner particle concentration of 6% by mass to be used as a two-component developer.

<Manufacturing of Magenta Toners [Ma1] to [Ma10]>

Magenta toners [Ma1] to [Ma10] were obtained in a similar manner to the above <Manufacturing of yellow toner [Ye1]> except that the amounts of the vinyl-based resin fine particle dispersion, the amorphous polyester resin fine particle dispersion, and the crystalline resin fine particle dispersion (each in terms of solid content) added, the type of crystalline resin, and the type of colorant fine particle dispersion were changed as illustrated in Table 5. Note that the % by mass of each of the vinyl-based resin, the amorphous polyester resin, and the crystalline resin illustrated in Table 5 represents the % by mass with respect to 600 parts by mass of the binder resin. The content of each of PM1 to PM3 in a magenta colorant illustrated in Table 5 represents % by mass with respect to 36.4 parts by mass (in terms of solid content) of the magenta colorant. Each of the obtained magenta toners [Ma1] to [Ma10] was mixed with a ferrite carrier having a volume average particle size of 32 μm coated with an acrylic resin so as to have a toner particle concentration of 6% by mass to be used as a two-component developer.

Note that the yellow toner [Ye], the cyan toner [Cy], and the magenta toner [Ma] in the present Example are the first toner, the second toner, and the third toner in the present invention, respectively.

TABLE 4

| Cyan toner | Vinyl resin | Type of cyan colorant | Crystalline resin: Type | Crystal structure moiety | Nucleating agent moiety | Nucleating agent moiety [% by mass] | HB | Mw | Composition ration of binder resin [% by mass]: Vinyl-based resin | Amorphous PES | Crystalline resin |
|---|---|---|---|---|---|---|---|---|---|---|---|
| Cy1 | S1 | PC1 | C1 | Crystalline PES | Stearic acid | 5 | Present | 11500 | 80 | 10 | 10 |
| Cy2 | S1 | PC1 | C8 | Crystalline PES | Stearic acid | 2 | Present | 13800 | 80 | 10 | 10 |
| Cy3 | S1 | PC1 | C15 | Crystalline PES | — | 0 | Present | 17500 | 80 | 10 | 10 |
| Cy4 | S1 | PC2 | C15 | Crystalline PES | — | 0 | Present | 17500 | 80 | 10 | 10 |
| Cy5 | S1 | PC2 | C1 | Crystalline PES | Stearic acid | 5 | Present | 11500 | 80 | 10 | 10 |
| Cy6 | S5 | PC1 | C15 | Crystalline PES | — | 0 | Present | 17500 | 80 | 10 | 10 |
| Cy7 | S5 | PC1 | C1 | Crystalline PES | Stearic acid | 5 | Present | 11500 | 80 | 10 | 10 |
| Cy8 | S1 | PC1 | — | — | — | — | — | — | 80 | 20 | 0 |
| Cy9 | S1 | PC1 | C1 | Crystalline PES | Stearic acid | 5 | Present | 11500 | 48 | 42 | 10 |

*S1 and S5 use D-S1 and D-S5, respectively.
*Crystalline PES and Amorphous PES indicate crystalline polyester and amorphous polyester, respectively.
*HB indicates hybrid crystalline polyester resin.

TABLE 5

| Magenta toner | Vinyl resin | % by mass in magenta colorant: PM1 | PM2 | PM3 | Crystalline resin: Type | Crystal structure moiety | Nucleating agent moiety |
|---|---|---|---|---|---|---|---|
| Ma1 | S1 | 0 | 30 | 70 | C1 | Crystalline PES | Stearic acid |
| Ma2 | S1 | 0 | 30 | 70 | C8 | Crystalline PES | Stearic acid |

TABLE 5-continued

| | | | | | | | |
|---|---|---|---|---|---|---|---|
| Ma3 | S1 | 0 | 30 | 70 | C15 | Crystalline PES | — |
| Ma4 | S1 | 0 | 0 | 100 | C15 | Crystalline PES | — |
| Ma5 | S1 | 0 | 60 | 40 | C15 | Crystalline PES | — |
| Ma6 | S1 | 50 | 50 | 0 | C15 | Crystalline PES | — |
| Ma7 | S5 | 0 | 30 | 70 | C15 | Crystalline PES | — |
| Ma8 | S5 | 0 | 30 | 70 | C1 | Crystalline PES | Stearic acid |
| Ma9 | S1 | 0 | 30 | 70 | — | — | — |
| Ma10 | S1 | 0 | 30 | 70 | C1 | Crystalline PES | Stearic acid |

| | Crystalline resin | | | Composition ration of binder resin [% by mass] | | |
|---|---|---|---|---|---|---|
| Magenta toner | Nucleating agent moiety [% by mass] | HB | Mw | Vinyl-based resin | Amorphous PES | Crystalline resin |
| Ma1 | 5 | Present | 11500 | 80 | 10 | 10 |
| Ma2 | 2 | Present | 13800 | 80 | 10 | 10 |
| Ma3 | 0 | Present | 17500 | 80 | 10 | 10 |
| Ma4 | 0 | Present | 17500 | 80 | 10 | 10 |
| Ma5 | 0 | Present | 17500 | 80 | 10 | 10 |
| Ma6 | 0 | Present | 17500 | 80 | 10 | 10 |
| Ma7 | 0 | Present | 17500 | 80 | 10 | 10 |
| Ma8 | 5 | Present | 11500 | 80 | 10 | 10 |
| Ma9 | — | — | — | 80 | 20 | 0 |
| Ma10 | 5 | Present | 11500 | 48 | 42 | 10 |

*S1 and S5 use D-S1 and D-S5, respectively.

*Crystalline PES and Amorphous PES indicate crystalline polyester and amorphous polyester, respectively.

*HB indicates hybrid crystalline polyester resin.

[Evaluation Method]

(i) Tacking Evaluation (i-a) Three Color Evaluation

Onto a device obtained by modifying a fixing device of a multifunction device "bizhub PRESS (registered trademark) C1070" (manufactured by Konica Minolta Inc.) so as to be able to change surface temperatures of a fixing upper belt and a fixing lower roller, two-component developers containing a yellow toner, a cyan toner, and a magenta toner, respectively, were sequentially loaded.

Using the above device, a fixing experiment of outputting a solid image with a toner adhesion amount of 10.2 g/m$^2$ on A4 size coated paper "OK Top Coat+(157.0 g/m$^2$)" (manufactured by Oji Paper Co., Ltd.) such that the yellow toner was on the outermost layer in an environment of normal temperature and humidity (temperature 20° C., humidity 50% RH) was performed at a fixing temperature of 180° C. for 800 sheets.

In order to record a paper surface temperature, out of images on the discharged sheets, to each of images on the first, 100th, 200th, 300th, 400th, 500th, 600th, and 700th sheets, a thermocouple "mold type surface sensor: MF-O-K" (manufactured by Toa Electric Inc.) was attached at the center of the sheet. After all 800 sheets on which images were fixed were loaded on a paper discharge tray, the sheets were left for eight hours until the paper temperature fell. A maximum temperature reached between the time when the sheets were discharged and the time when the sheets were cooled was defined as a measurement temperature of the sheets.

The degree of adhesion between superimposed parts of an image after being left for eight hours was evaluated for the images on the first, 100th, 200th, 300th, 400th, 500th, 600th, and 700th sheets according to the following evaluation criteria.

(Evaluation Criteria)

OK: Roughness on a toner image surface is not visually recognized after superimposed sheets are peeled off from each other.

NG: A toner image surface is rough after superimposed sheets are peeled off from each other.

The above measurement temperature in an image that was OK according to the above evaluation criteria was defined as a tacking elimination temperature. Note that the above measurement temperature can be controlled by changing the volume of discharged paper air. When all the images on the first, 100th, 200th, 300th, 400th, 500th, 600th, and 700th sheets were NG, the volume of discharged paper air was increased, and a similar experiment was repeated until an OK level image was obtained.

The tacking elimination temperature was judged according to the following evaluation criteria, and ⊙ and ○ were determined as acceptable levels. No occurrence of tacking is desirable even if a sheet is discharged at a higher temperature.

(Evaluation Criteria)

⊙: 60° C. or higher

○: 58° C. or higher and lower than 60° C.

Δ: 55° C. or higher and lower than 58° C.

x: Lower than 55° C.

(i-b) Secondary Color Evaluation

Tacking was evaluated in a similar manner to the above (i-a) except that an image was formed using a cyan toner and a magenta toner, and the amount of toner adhering to paper was changed to 7.5 g/m$^2$. Note that in the present Example, when an image is formed, a small amount of yellow toner is imparted for the purpose of preventing counterfeiting.

(ii) Wax Adhesion Evaluation (ii-a) Three Color Evaluation

A fixing device of a multifunction device "Accurio Press C3080" (manufactured by Konica Minolta Inc.) was modified so as to be able to change a surface temperature of a fixing upper belt in a range of 140 to 220° C. and to be able to change a surface temperature of a fixing lower roller in a range of 120 to 200° C.

The two-component developers containing a yellow toner, a cyan toner, and a magenta toner, respectively, were sequentially loaded onto this modified device, and a solid image with a toner adhesion amount of 8.0 g/$m^2$ was formed on A4 (basis weight 157 g/$m^2$) gloss-coated paper such that the yellow toner was on the outermost layer in a normal temperature and humidity (temperature 20° C., humidity 50% RH) environment, and fixed. A fixing rate during fixing was 460 mm/sec, and a fixing temperature (surface temperature of the fixing upper belt) was an under-offset temperature+35° C.

After 100 sheets were printed, a wax adhesion state to a conveyance roller and readhesion from the conveyance roller to an image were visually evaluated, and ⊙, ○, and Δ were judged to be acceptable levels according to the following evaluation criteria.

(Evaluation Criteria)

⊙: No wax adhesion is confirmed for both adhesion to the conveyance roller and readhesion to an image.

○: Wax adhesion to the conveyance roller is slightly confirmed, but readhesion to an image is not confirmed, which is at a level having no problem with quality.

Δ: Wax adhesion to the conveyance roller is confirmed, but readhesion to an image is hardly confirmed, which is at a level having no problem with quality.

x: A large amount of wax adhesion to the conveyance roller is confirmed, and readhesion to an image occurs, which is at a level that cannot be put into practical use.

(ii-b) Secondary Color Evaluation

Wax adhesion was evaluated in a similar manner to the above (ii-a) except that an image was formed using a cyan toner and a magenta toner, and the amount of toner adhering to paper was changed to 6.0 g/$m^2$. Note that in the present Example, when an image is formed, a small amount of yellow toner is imparted for the purpose of preventing counterfeiting.

(iii) Evaluation of Low-Temperature Fixability (iii-a) Three Color Evaluation

Onto a device obtained by modifying a fixing device of a multifunction device "bizhub PRESS (registered trademark) C1070" (manufactured by Konica Minolta Inc.) so as to be able to change a fixing temperature, a toner adhesion amount, a system speed, and surface temperatures of a fixing upper belt and a fixing lower roller, two-component developers containing a yellow toner, a cyan toner, and a magenta toner, respectively, were sequentially loaded.

The amount of adhesion was set to 11.3 g/$m^2$ on A4 size high-quality paper "NPI high-quality (127.9 g/$m^2$)" (manufactured by Nippon Paper Industries Co., Ltd.)" in a normal temperature and humidity (temperature 20° C., humidity 50% RH) environment. Thereafter, a fixing experiment of fixing an image having a size of 100 mm×100 mm such that the yellow toner was on the outermost layer was repeatedly performed while a set fixing temperature was raised in 2° C. increments from 110° C. to 180° C.

A surface temperature of the fixing upper belt at a lowest fixing temperature at which image stains due to fixing offset were not visually confirmed was defined as a lowest fixing temperature (U.O. avoidance temperature), and low-temperature fixability was evaluated according to the following evaluation criteria.

(Evaluation Criteria)

⊙: Lowest fixing temperature is lower than 125° C.

○: Lowest fixing temperature is 125° C. or higher and lower than 130° C.

Δ: Lowest fixing temperature is 130° C. or higher and lower than 135° C.

x: Lowest fixing temperature is 135° C. or higher (iii-b) Secondary Color Evaluation Low-temperature fixability was evaluated in a similar manner to the above (iii-a) except that an image was formed using a cyan toner and a magenta toner, and the amount of toner adhering to paper was changed to 8.0 g/$m^2$. Note that in the present Example, when an image is formed, a small amount of yellow toner is imparted for the purpose of preventing counterfeiting.

(iv) Fold Fixability (iv-a) Three Color Evaluation

Onto a device obtained by modifying a fixing device of a multifunction device "bizhub PRESS (registered trademark) C1070" (manufactured by Konica Minolta Inc.) so as to be able to change surface temperatures of a fixing upper belt and a fixing lower roller, two-component developers were sequentially loaded. The above device was modified such that a fixing temperature, a toner adhesion amount, and a system speed could be set freely.

A fixing experiment of outputting a solid image with an adhesion amount of 11.3 g/$m^2$ on A4 size high-quality paper "NPI high-quality (127.9 g/$m^2$)" (manufactured by Oji Paper Co., Ltd.) such that the yellow toner was on the outermost layer in an environment of normal temperature and humidity (temperature 20° C., humidity 50% RH) was repeatedly performed while a set fixing temperature was raised in 5° C. increments from 100° C. to 200° C.

Subsequently, the printed matter obtained in the fixing experiment at each fixing temperature was folded with a folding machine under a weight load equivalent to 10 g/$cm^2$ such that the printed matter was valley-folded in a direction in which parts of the solid image came into contact with each other, and compressed air of 0.35 MPa was blown onto the solid images. The crease was ranked according to the following evaluation criteria. Results thereof are illustrated in Table below.

(Evaluation Criteria)

5: No crease

4: Peeling is partially observed along a crease

3: Fine linear peeling is observed along a crease

2: Thick linear peeling is observed along a crease

1: Peeling is significantly observed along a crease

Among images of rank 2 or higher, the surface temperature of the fixing upper belt in the fixing experiment having the lowest fixing temperature was defined as a fixing lower limit temperature. For this fixing lower limit temperature, fold fixability was evaluated according to the following evaluation criteria.

(Evaluation Criteria)

⊙: Fixing lower limit temperature is lower than 145° C.

○: Fixing lower limit temperature is 145° C. or higher and lower than 150° C.

Δ: Fixing lower limit temperature is 150° C. or higher and lower than 155° C.

x: Fixing lower limit temperature is 155° C. or higher (iv-b) Secondary Color Evaluation Low-temperature fixability was evaluated in a similar manner to the above (iii-a) except that an image was formed using a cyan toner and a magenta toner, and the amount of toner adhering to paper was changed to 8.0 g/$m^2$. Note that in the present Example, when an image is formed, a small amount of yellow toner is imparted for the purpose of preventing counterfeiting.

The above evaluation tests (i) to (iv) were performed using the toner sets of Experiments 1 to 42 illustrated in Table 6. Note that the numerical values in the items of tacking, low-temperature fixability, and fold fixability in Table 6 represent measured values of temperature (° C.) measured for each evaluation.

TABLE 6

| | | Toner set | | | Evaluation<br>Three color evaluation | | | |
|---|---|---|---|---|---|---|---|---|
| | Experiment No. | Yellow toner | Cyan toner | Magenta toner | Tacking | Wax adhesion | Low-temperature fixability | Fold fixability |
| Example | 1 | Ye1 | Cy3 | Ma3 | 60.7 (⊙) | ⊙ | 124.9 (⊙) | 143.1 (⊙) |
| | 2 | Ye2 | | | 60.6 (⊙) | ⊙ | 124.8 (⊙) | 143.3 (⊙) |
| | 3 | Ye3 | | | 60.7 (⊙) | ⊙ | 126.3 (○) | 145.2 (○) |
| | 4 | Ye4 | | | 59.5 (○) | Δ | 124.2 (⊙) | 145.1 (○) |
| | 5 | Ye5 | | | 61.1 (⊙) | ⊙ | 127.3 (○) | 146.1 (○) |
| | 6 | Ye6 | | | 60.2 (⊙) | ○ | 126.5 (○) | 144.4 (⊙) |
| | 7 | Ye7 | | | 59.1 (○) | Δ | 124.1 (⊙) | 143.9 (⊙) |
| | 8 | Ye8 | | | 60.2 (⊙) | ○ | 129.2 (○) | 148.5 (○) |
| | 9 | Ye9 | | | 60.7 (⊙) | ○ | 129.8 (○) | 151.9 (Δ) |
| | 10 | Ye10 | | | 60.3 (⊙) | Δ | 125.0 (○) | 145.9 (○) |
| | 11 | Ye11 | | | 57.7 (Δ) | Δ | 124.1 (⊙) | 146.3 (○) |
| | 12 | Ye12 | | | 59.5 (○) | ○ | 127.8 (○) | 147.8 (○) |
| | 13 | Ye13 | | | 60.7 (⊙) | Δ | 129.8 (○) | 151.4 (Δ) |
| | 14 | Ye14 | | | 59.3 (○) | ⊙ | 124.5 (⊙) | 150.7 (Δ) |
| | 15 | Ye15 | | | 58.9 (○) | ○ | 126.7 (○) | 146.1 (○) |
| | 16 | Ye16 | | | 58.3 (○) | Δ | 123.6 (⊙) | 145.1 (○) |
| | 17 | Ye17 | | | 57.5 (Δ) | ○ | 124.6 (⊙) | 143.5 (⊙) |
| | 18 | Ye18 | | | 58.2 (○) | Δ | 129.9 (○) | 153.9 (Δ) |
| | 19 | Ye19 | | | 59.2 (○) | ○ | 131.1 (Δ) | 154.6 (Δ) |
| | 20 | Ye20 | | | 57.0 (Δ) | Δ | 125.2 (○) | 148.2 (○) |
| | 21 | Ye1 | Cy1 | Ma1 | 61.5 (⊙) | ⊙ | 133.1 (Δ) | 153.1 (Δ) |
| | 22 | | Cy2 | Ma2 | 61.0 (⊙) | ⊙ | 128.1 (○) | 144.6 (⊙) |
| | 23 | | Cy3 | Ma4 | 60.3 (⊙) | ⊙ | 124.8 (⊙) | 143.7 (⊙) |
| | 24 | | | Ma5 | 60.9 (⊙) | ⊙ | 126.3 (○) | 145.9 (○) |
| | 25 | | | Ma6 | 61.1 (⊙) | ⊙ | 128.9 (○) | 149.1 (○) |
| | 26 | Ye7 | Cyl | Ma1 | 59.8 (○) | Δ | 131.9 (Δ) | 150.7 (Δ) |
| | 27 | | Cy2 | Ma2 | 59.3 (○) | Δ | 129.7 (○) | 146.1 (○) |
| | 28 | | Cy3 | Ma6 | 58.8 (○) | Δ | 131.0 (Δ) | 152.2 (Δ) |
| | 29 | Ye8 | Cyl | Ma1 | 60.9 (⊙) | ⊙ | 133.1 (Δ) | 154.7 (Δ) |
| | 30 | | Cy2 | Ma2 | 60.1 (⊙) | ○ | 130.6 (Δ) | 148.9 (○) |
| | 31 | | Cy3 | Ma6 | 60.4 (⊙) | ○ | 132.1 (Δ) | 151.2 (Δ) |
| Comparative Example | 32 | Ye21 | Cy3 | Ma3 | 55.3 (Δ) | X | 134.1 (Δ) | 149.6 (○) |
| | 33 | Ye22 | | | 56.1 (Δ) | X | 139.8 (X) | 157.2 (X) |
| | 34 | Ye23 | | | 54.6 (X) | X | 129.1 (○) | 147.8 (○) |
| | 35 | Ye24 | | | 54.9 (X) | X | 129.6 (○) | 148.8 (○) |
| | 36 | Ye1 | Cy4 | Ma3 | 60.1 (⊙) | ⊙ | 126.1 (○) | 158.2 (X) |
| | 37 | | Cy5 | | 60.3 (⊙) | ⊙ | 125.4 (○) | 156.4 (X) |
| | 38 | | Cy6 | Ma7 | 56.3 (Δ) | X | 125.1 (○) | 144.1 (⊙) |
| | 39 | | Cy7 | Ma8 | 57.8 (Δ) | Δ | 128.9 (○) | 150.4 (Δ) |
| | 40 | | Cy8 | Ma9 | 60.8 (⊙) | ⊙ | 137.1 (X) | 162.2 (X) |
| | 41 | Ye22 | Cy8 | Ma9 | 61.2 (⊙) | Δ | 140.6 (X) | 166.1 (X) |
| | 42 | Ye1 | Cy9 | Ma10 | 59.5 (○) | ⊙ | 131.2 (Δ) | 156.2 (X) |

| | | Evaluation<br>Secondary color evaluation (blue) | | | |
|---|---|---|---|---|---|
| | Experiment No. | Tacking | Wax adhesion | Low-temperature fixability | Fold fixability |
| Example | 1 | 61.1 (⊙) | ⊙ | 121.9 (⊙) | 133.1 (⊙) |
| | 2 | 61.1 (⊙) | ⊙ | 122.1 (⊙) | 133.2 (⊙) |
| | 3 | 60.5 (⊙) | ○ | 122.0 (⊙) | 133.1 (⊙) |
| | 4 | 61.2 (⊙) | ⊙ | 121.8 (⊙) | 133.3 (⊙) |
| | 5 | 59.8 (○) | Δ | 122.1 (⊙) | 133.2 (⊙) |
| | 6 | 59.5 (○) | Δ | 122.2 (⊙) | 133.2 (⊙) |
| | 7 | 58.8 (○) | Δ | 121.6 (⊙) | 133.3 (⊙) |
| | 8 | 58.9 (○) | Δ | 122.2 (⊙) | 133.1 (⊙) |
| | 9 | 57.9 (Δ) | Δ | 122.3 (⊙) | 133.2 (⊙) |
| | 10 | 58.7 (○) | Δ | 122.2 (⊙) | 133.3 (⊙) |
| | 11 | 57.8 (Δ) | Δ | 122.1 (⊙) | 133.2 (⊙) |
| | 12 | 60.8 (⊙) | ⊙ | 122.3 (⊙) | 133.1 (⊙) |
| | 13 | 59.7 (○) | Δ | 122.2 (⊙) | 133.2 (⊙) |
| | 14 | 61.3 (⊙) | ⊙ | 122.4 (⊙) | 133.2 (⊙) |
| | 15 | 58.4 (○) | Δ | 122.3 (⊙) | 133.1 (⊙) |
| | 16 | 58.9 (○) | Δ | 122.2 (⊙) | 133.3 (⊙) |
| | 17 | 56.9 (Δ) | Δ | 122.2 (⊙) | 133.2 (⊙) |
| | 18 | 58.9 (○) | ○ | 122.4 (⊙) | 133.2 (⊙) |
| | 19 | 60.1 (⊙) | ⊙ | 122.5 (⊙) | 133.1 (⊙) |
| | 20 | 56.5 (Δ) | Δ | 122.1 (⊙) | 133.1 (⊙) |
| | 21 | 63.5 (⊙) | ⊙ | 129.0 (○) | 144.5 (Δ) |
| | 22 | 62.5 (⊙) | ⊙ | 125.1 (○) | 134.8 (⊙) |

TABLE 6-continued

| | | | | | |
|---|---|---|---|---|---|
| | 23 | 60.8 (⊙) | ⊙ | 121.0 (⊙) | 131.9 (⊙) |
| | 24 | 61.3 (⊙) | ⊙ | 125.2 (○) | 139.6 (○) |
| | 25 | 61.4 (⊙) | ⊙ | 130.6 (Δ) | 141.7 (Δ) |
| | 26 | 63.2 (⊙) | ⊙ | 129.1 (○) | 144.1 (Δ) |
| | 27 | 62.4 (⊙) | ⊙ | 125.2 (○) | 134.6 (⊙) |
| | 28 | 61.0 (⊙) | ○ | 130.2 (Δ) | 140.5 (Δ) |
| | 29 | 63.2 (⊙) | ⊙ | 129.3 (○) | 144.7 (Δ) |
| | 30 | 61.5 (⊙) | ○ | 125.2 (○) | 134.6 (⊙) |
| | 31 | 59.5 (○) | Δ | 131.1 (Δ) | 140.9 (Δ) |
| Comparative Example | 32 | 58.7 (○) | Δ | 122.3 (⊙) | 133.2 (⊙) |
| | 33 | 55.7 (Δ) | X | 122.1 (⊙) | 133.3 (⊙) |
| | 34 | 57.3 (Δ) | Δ | 122.1 (⊙) | 133.1 (⊙) |
| | 35 | 55.6 (Δ) | X | 121.9 (⊙) | 133.2 (⊙) |
| | 36 | 61.0 (⊙) | ⊙ | 122.3 (⊙) | 156.1 (X) |
| | 37 | 61.2 (⊙) | ⊙ | 121.9 (⊙) | 154.8 (Δ) |
| | 38 | 53.6 (X) | X | 121.8 (⊙) | 133.4 (⊙) |
| | 39 | 55.8 (Δ) | X | 128.5 (○) | 142.9 (Δ) |
| | 40 | 61.1 (⊙) | ⊙ | 131.4 (Δ) | 157.2 (X) |
| | 41 | 61.1 (⊙) | Δ | 131.6 (Δ) | 157.5 (X) |
| | 42 | 57.6 (○) | Δ | 128.6 (○) | 152.1 (Δ) |

[Results and Discussion]

In the three color evaluation, low-temperature fixability was equal to or higher, tacking and wax adhesion were more suppressed, and fold fixability was better in Experiments 1 to 31 than those in Experiments 32 to 42. In addition, also in the secondary color evaluation in which only a small amount of yellow toner was used, low-temperature fixability was equal to or higher, tacking and wax adhesion were more suppressed, and fold fixability was better in Experiments 1 to 31 than those in Experiments 32 to 42. In particular, the melting point of the hydrocarbon wax in the yellow toner, the content and weight average molecular weight of the crystalline resin in the binder resin, the content and carbon number of the crystal nucleating agent moiety in the crystalline resin, and the content of the vinyl-based resin were each in a more preferable range in Experiments 1 and 2 than those in Experiments 3 to 20, and the crystalline resin was a hybrid amorphous polyester resin in Experiments 1 and 2. Therefore, tacking and wax adhesion were more suppressed, and the fold fixability was better in Experiments 1 and 2 than those in Experiments 3 to 20.

For Experiments 1 to 3, 5 to 11, 13, 15 to 18, 20 to 25, and 29 to 31, evaluations of tacking and wax adhesion were better in the three color evaluation than those in the secondary color evaluation. It is considered that this is due to use of a larger amount of yellow toner containing a crystal nucleating agent in the three color evaluation than in the secondary color evaluation. In addition, the cyan toner also contains a crystalline resin and further contains the colorant represented by general formula (1). Therefore, it is considered that low-temperature fixability and fold fixability equal to or higher than those in the three color evaluation were exhibited in the secondary color evaluation of Experiments 1 to 31.

In Experiment 4, a yellow toner containing wax having a melting point of 78.0° C. was used, and therefore it is considered that evaluations of tacking and wax adhesion were better in the secondary color evaluation in which the amount of yellow toner used was smaller than those in the three color evaluation. In Experiments 12 and 19, the amount of the crystal nucleating agent moiety in the yellow toner was larger than the more preferable range, and therefore it is considered that an interaction between the wax and the crystalline resin became too strong, and the wax and the crystalline resin were compatible with each other to delay crystallization of the crystalline resin. Therefore, it is considered that evaluations of tacking and wax adhesion were better in the secondary color evaluation in which the amount of yellow toner used was smaller than those in the three color evaluation. In Experiment 14, the content of the crystalline resin in the yellow toner was 15% by mass or more, and therefore it is considered that the vinyl-based resin was excessively plasticized. Therefore, it is considered that the evaluation of tacking was better in the secondary color evaluation in which the amount of yellow toner used was smaller than that in the three color evaluation. In Experiments 26 and 27, the weight average molecular weight (Mw) of the crystalline resin in the yellow toner was 1000 or less, and therefore it is considered that the crystalline resin was easily compatible with the vinyl-based resin and the wax. Therefore, it is considered that evaluations of tacking and wax adhesion were better in the secondary color evaluation in which the amount of yellow toner used was smaller than those in the three color evaluation.

Meanwhile, in Experiment 32, the wax in the yellow toner was an ester wax, and therefore it is considered that tacking and wax adhesion deteriorated in the three color evaluation. In Experiments 33 and 41, the yellow toner on the outermost layer of the image did not contain the crystalline resin, and therefore it is considered that the wax adhesion deteriorated in addition to low-temperature fixability and fold fixability in the three color evaluation. In Experiment 34, the content of the vinyl-based resin in the yellow toner was less than 50% by mass, and therefore it is considered that domains of the crystalline resin could not be finely dispersed, and tacking and wax adhesion deteriorated in the three color evaluation. In Experiment 35, the yellow toner did not contain the crystal nucleating agent moiety, and therefore it is considered that tacking and wax adhesion deteriorated in the three color evaluation.

In Experiments 36 and 37, the cyan toner did not contain the colorant represented by general formula (1), and therefore it is considered that fold fixability deteriorated in both the three color evaluation and the secondary color evaluation. In Experiments 38 and 39, the wax contained in each of the cyan toner and the magenta toner was an ester wax, and therefore it is considered that tacking and wax adhesion deteriorated in both the three color evaluation and the secondary color evaluation. In Experiment 40, each of the cyan toner and the magenta toner did not contain the crystalline resin, and therefore it is considered that low-temperature fixability and fold fixability deteriorated in both the three color evaluation and the secondary color evaluation. In Experiment 42, the content of the vinyl-based resin contained in each of the cyan toner and the magenta toner, which were contained in a lower layer than the yellow toner, was less than 50% by mass in the three color evaluation, and therefore it is considered that fold fixability deteriorated.

The toner set according to an embodiment of the present invention has made it possible to suppress tacking of an image formed by a toner and to improve fold fixability. Therefore, it is expected that the present invention will make formation of a high-quality image with a toner easier and contribute to advancement and popularization of technology in this field.

Although embodiments of the present invention have been described and illustrated in detail, the disclosed embodiments are made for purposes of illustration and example only and not limitation. The scope of the present invention should be interpreted by terms of the appended claims

What is claimed is:

1. A toner set comprising a plurality of toners, wherein the toner set includes a first toner containing a yellow colorant and a second toner containing a cyan colorant, the first toner and the second toner each contain a binder resin containing a vinyl-based resin and a crystalline resin, and a release agent containing a hydrocarbon wax, a content of the vinyl-based resin with respect to a total mass of the binder resin is 50% by mass or more, the first toner contains the crystalline resin having a moiety having a crystal structure and a crystal nucleating agent moiety having a crystal nucleating agent, and the second toner contains the cyan colorant that is a compound represented by general formula (1):

[Chemical formula 1]

(1)

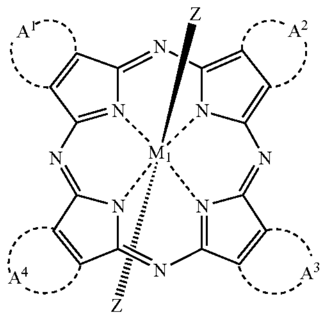

where, M represents any one of a silicon atom, a germanium atom, a cobalt atom, and a zinc atom, $A^1$, $A^2$, $A^3$, and $A^4$ each independently represent an atomic group forming an aromatic ring which may have an electron-withdrawing substituent, and Zs each independently represent an aryloxy group having 6 or more and 18 or less carbon atoms, an alkoxy group having 1 or more and 22 or less carbon atoms, or a group represented by the following general formula (1-1), and

[Chemical formula 2]

(1-1)

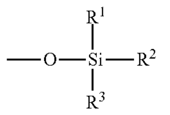

where, $R^1$, $R^2$, and $R^3$ each independently represent an alkyl group, an aryl group, or an alkoxy group having 1 or more and 6 or less carbon atoms.

2. The toner set according to claim 1, wherein the crystal nucleating agent moiety is derived from at least one compound selected from the group consisting of an aliphatic monocarboxylic acid having 10 or more and 30 or less carbon atoms and an aliphatic monoalcohol having 10 or more and 30 or less carbon atoms.

3. The toner set according to claim 1, wherein in the first toner, a content of the vinyl-based resin with respect to a total mass of the binder resin is 60% by mass or more.

4. The toner set according to claim 1, wherein in the first toner, a content of the crystal nucleating agent moiety with respect to a total mass of the crystalline resin excluding the crystal nucleating agent is 3% by mass or more and 9% by mass or less.

5. The toner set according to claim 1, wherein in the first toner, a content of the crystalline resin with respect to a total mass of the binder resin is 4% by mass or more and 15% by mass or less.

6. The toner set according to claim 1, wherein the first toner contains a crystalline polyester as the crystalline resin.

7. The toner set according to claim 1, wherein the first toner contains a hybrid crystalline polyester resin obtained by bonding a crystalline polyester polymerization segment and a vinyl-based resin polymerization segment to each other as the crystalline resin.

8. The toner set according to claim 1, wherein the first toner has a weight average molecular weight (Mw) of the crystalline resin satisfying formula (1)

$$1000 \leq Mw \leq 29000 \quad (1).$$

9. The toner set according to claim 1, wherein the first toner has a weight average molecular weight (Mw) of the crystalline resin satisfying formula (2)

$$1000 \leq Mw \leq 20000 \quad (2).$$

10. The toner set according to claim 1, wherein the first toner has a weight average molecular weight (Mw) of the crystalline resin satisfying formula (3)

$$1000 \leq Mw \leq 15000 \quad (3).$$

11. The toner set according to claim 1, wherein the first toner contains the hydrocarbon wax having a melting point of 80° C. or higher and 92° C. or lower.

12. The toner set according to claim 1, wherein the first toner contains the hydrocarbon wax having a melting point of 80° C. or higher and 88° C. or lower.

13. The toner set according to claim 1, wherein in the second toner, a content of the crystal nucleating agent moiety with respect to a total mass of the crystalline resin excluding the crystal nucleating agent is less than 3% by mass.

14. The toner set according to claim 1, further comprising a third toner containing a magenta colorant, wherein the third toner contains a binder resin containing a vinyl-based resin and a crystalline resin, and a release agent containing a hydrocarbon wax, and a content of the vinyl-based resin with respect to a total mass of the binder resin is 50% by mass or more, and in the third toner, a content of the crystal nucleating agent moiety with respect to a total mass of the crystalline resin excluding the crystal nucleating agent is less than 3% by mass.

15. The toner set according to claim 14, wherein the magenta colorant contains a compound obtained by a reaction between a colorant represented by general formula (2) and a metal-containing compound represented by general formula (3) in an amount of 50% by mass or more with respect to a total mass of the magenta colorant:

[Chemical formula 3]

(2)

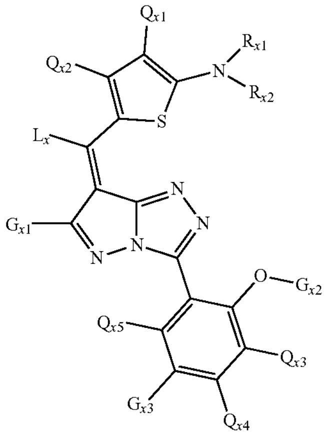

where, $R_{x1}$ and $R_{x2}$ each independently represent a substituted or unsubstituted linear, branched, or cyclic alkyl group having 1 or more and 20 or less carbon atoms, Lx represents a hydrogen atom or a substituted or unsubstituted linear, branched, or cyclic alkyl group having 1 or more and 20 or less carbon atoms, $G_{x1}$ represents a substituted or unsubstituted linear, branched, or cyclic alkyl group having 2 or more and 20 or less carbon atoms, $G_{x2}$ represents a substituted or unsubstituted linear or branched alkyl group having 1 or more and 5 or less carbon atoms, Go represents a hydrogen atom, a halogen atom, a group represented by $G_{x4}$-CO—NH—, or a group represented by $G_{x5}$-N($G_{x6}$)—CO—, in which $G_{x4}$ represents a substituent, $G_{x5}$ and $G_{x6}$ each independently represent a hydrogen atom or a substituent, and $Q_{x1}$, $Q_{x2}$, $Q_{x3}$, $Q_{x4}$, and $Q_{x5}$ each independent represent a hydrogen atom or a substituent, and

[Chemical formula 4]

(3)

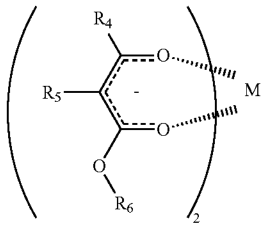

where, $R_4$ represents a substituted or unsubstituted linear, branched, or cyclic alkyl group having 1 or more and 20 or less carbon atoms, $R_5$ represents a hydrogen atom, an alkoxycarbonyl group, an arylcalbonyl group, an aryloxycarbonyl group, a sulfamoyl group, a sulfinyl group, an alkylsulfonyl group, an arylsulfonyl group, an acyl group, a nitrophenyl group, a halogen atom, or a cyano group, $R_6$ represents a substituted or unsubstituted aromatic hydrocarbon-containing group having 9 or more and 120 or less carbon atoms, and M represents a divalent metal element.

16. An image forming method comprising:

attaching a first toner containing a yellow colorant to a recording medium and fixing the first toner; and attaching a second toner containing a cyan colorant to the recording medium and fixing the second toner, wherein the first toner and the second toner each contain a binder resin containing a vinyl-based resin and a crystalline resin, and a release agent containing a hydrocarbon wax, a content of the vinyl-based resin with respect to a total mass of the binder resin is 50% by mass or more, the first toner contains the crystalline resin having a moiety having a crystal structure and a crystal nucleating agent moiety having a crystal nucleating agent, and the second toner contains the cyan colorant that is a compound represented by general formula (1):

[Chemical formula 5]

(1)

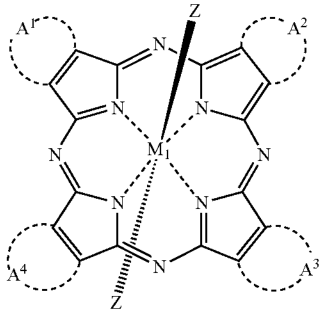

where, M represents any one of a silicon atom, a germanium atom, a cobalt atom, and a zinc atom, $A^1$, $A^2$, $A^3$, and $A^4$ each independently represent an atomic group forming an aromatic ring which may have an electron-withdrawing substituent, and Zs each independently represent an aryloxy group having 6 or more and 18 or less carbon atoms, an alkoxy group having 1 or more and 22 or less carbon atoms, or a group represented by the following general formula (1-1), and

[Chemical formula 6]
(1-1)
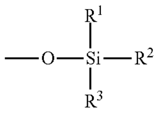
where, $R^1$, $R^2$, and $R^3$ each independently represent an alkyl group, an aryl group, or an alkoxy group having 1 or more and 6 or less carbon atoms.
17. The image forming method according to claim 16, wherein
the first toner is attached to a position farthest from a surface of the recording medium.
* * * * *